United States Patent
Nagata

(10) Patent No.: US 10,205,852 B2
(45) Date of Patent: Feb. 12, 2019

(54) SYSTEM, APPARATUS, AND METHOD FOR ALLOWING A PROGRAM TO CACHE USER INFORMATION

(71) Applicant: Tadashi Nagata, Kanagawa (JP)

(72) Inventor: Tadashi Nagata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/513,227

(22) PCT Filed: Dec. 16, 2015

(86) PCT No.: PCT/JP2015/006269
§ 371 (c)(1),
(2) Date: Mar. 22, 2017

(87) PCT Pub. No.: WO2016/103647
PCT Pub. Date: Jun. 30, 2016

(65) Prior Publication Data
US 2017/0244865 A1    Aug. 24, 2017

(30) Foreign Application Priority Data

Dec. 25, 2014 (JP) .................................. 2014-261712
Dec. 14, 2015 (JP) .................................. 2015-242835

(51) Int. Cl.
*H04N 1/44* (2006.01)
*G06F 9/451* (2018.01)
(Continued)

(52) U.S. Cl.
CPC ............. *H04N 1/4413* (2013.01); *G06F 3/00* (2013.01); *G06F 9/451* (2018.02);
(Continued)

(58) Field of Classification Search
USPC .................................................. 358/1.1–3.29
See application file for complete search history.

(56) References Cited

U.S. PATENT DOCUMENTS

| | | | |
|---|---|---|---|
| 7,752,450 | B1 | 7/2010 | Palmer et al. |
| 7,882,538 | B1 | 2/2011 | Palmer |

(Continued)

FOREIGN PATENT DOCUMENTS

| | | |
|---|---|---|
| EP | 2256657 | 12/2010 |
| EP | 2434423 | 3/2012 |

(Continued)

OTHER PUBLICATIONS

Extended European Search Report for 15872220.7 dated Aug. 25, 2017.
International Search Report dated Mar. 8, 2016 in PCT/JP2015/006269 filed on Dec. 16, 2015.

*Primary Examiner* — Marcellus Augustin
(74) *Attorney, Agent, or Firm* — IPUSA, PLLC

(57) ABSTRACT

An information processing system includes a first storage that stores user information about one or more users of the information processing system; a second storage; a first determining unit that determines, depending on whether a program sets the second storage to store predetermined user information from the user information stored in the first storage, the predetermined user information being used in the program, whether to store the predetermined user information in the second storage; and a user information process unit that obtains the predetermined user information from the user information and stores the predetermined user information in the second storage if the first determining unit determines that the predetermined user information is to be stored in the second storage.

8 Claims, 20 Drawing Sheets

(51) Int. Cl.
  *G06F 12/0802* (2016.01)
  *G06F 21/31* (2013.01)
  *G06F 21/60* (2013.01)
  *H04N 1/00* (2006.01)
  *G06F 3/00* (2006.01)
  *G06F 21/57* (2013.01)
  *H04L 29/06* (2006.01)

(52) U.S. Cl.
  CPC .......... *G06F 12/0802* (2013.01); *G06F 21/31* (2013.01); *G06F 21/575* (2013.01); *G06F 21/608* (2013.01); *H04L 63/0892* (2013.01); *H04N 1/00* (2013.01); *H04N 1/00244* (2013.01); *H04N 1/4433* (2013.01); *G06F 2212/455* (2013.01); *G06F 2212/60* (2013.01); *G06F 2221/2145* (2013.01); *H04N 2201/0094* (2013.01)

(56) References Cited

U.S. PATENT DOCUMENTS

| | | | |
|---|---|---|---|
| 2007/0180493 A1* | 8/2007 | Croft | G06F 3/1415 726/2 |
| 2007/0245409 A1* | 10/2007 | Harris | H04L 67/06 726/5 |
| 2011/0184993 A1* | 7/2011 | Chawla | G06F 9/45533 707/802 |
| 2012/0047567 A1 | 2/2012 | Ishizaka | |
| 2012/0191601 A1 | 7/2012 | Yoshida | |
| 2015/0261776 A1* | 9/2015 | Attarde | G06F 17/30156 707/664 |

FOREIGN PATENT DOCUMENTS

| | | |
|---|---|---|
| JP | 2010-277557 | 12/2010 |
| JP | 2014-049003 | 3/2014 |

* cited by examiner

[Fig. 1]
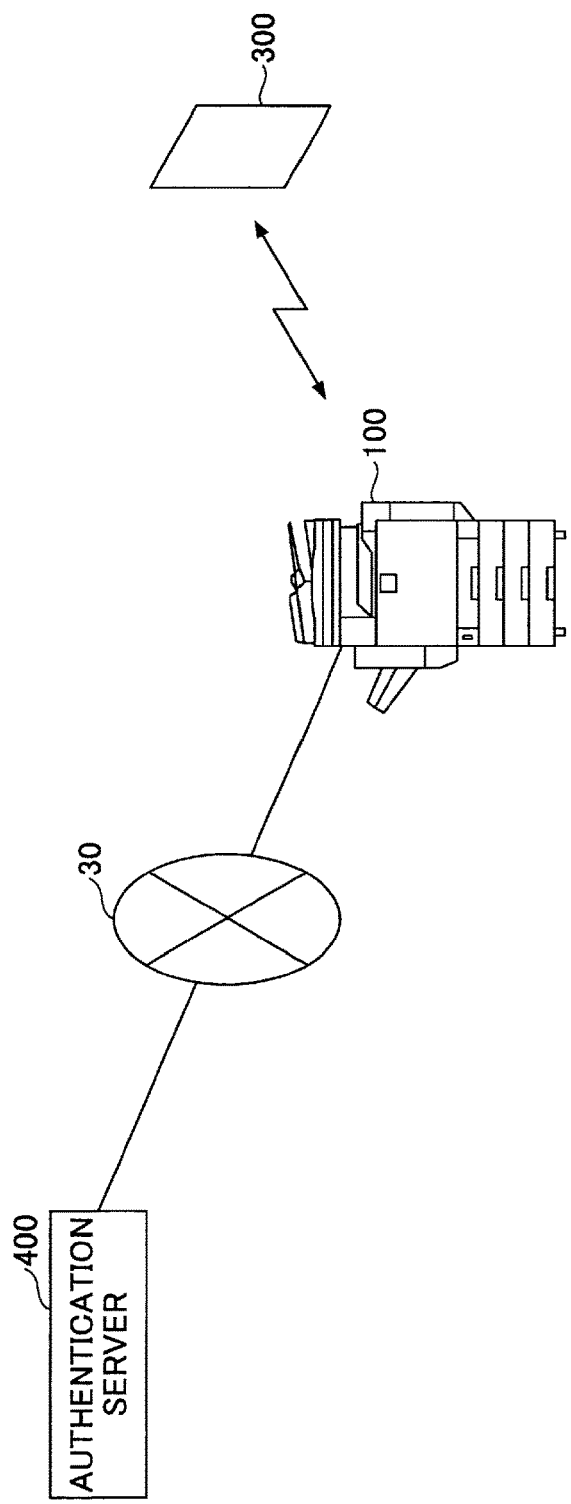

[Fig. 2]
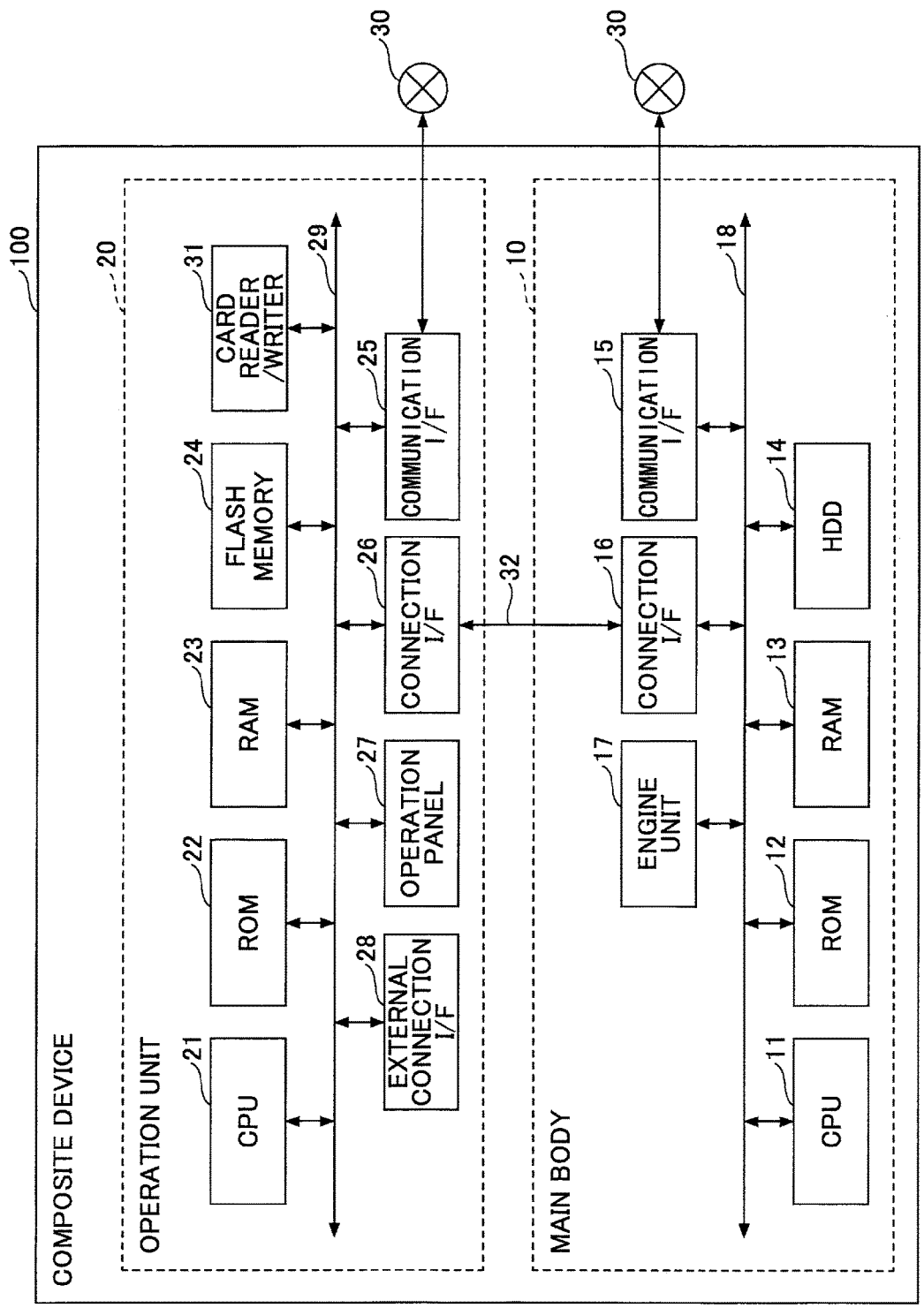

[Fig. 3]
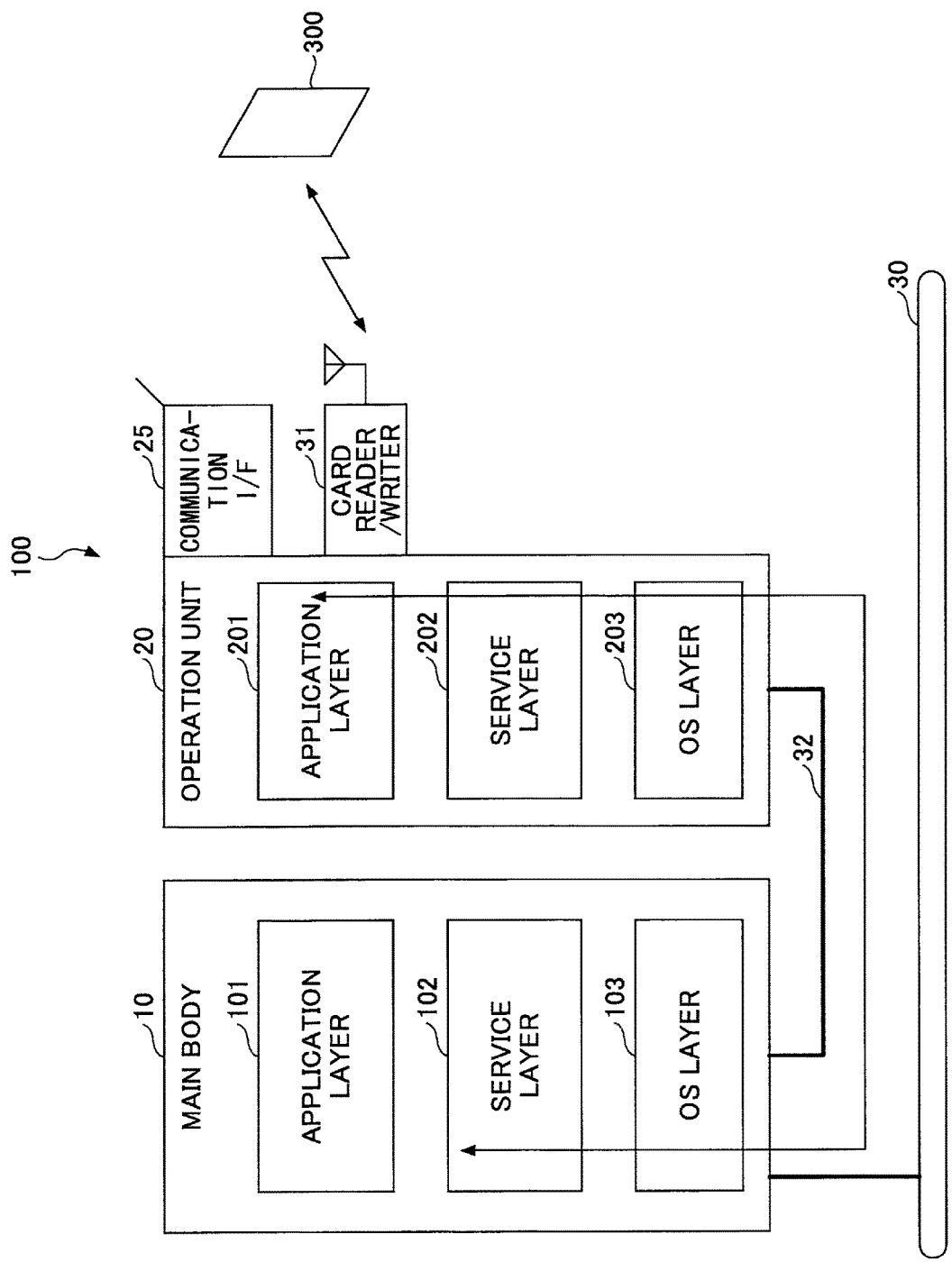

[Fig. 4]
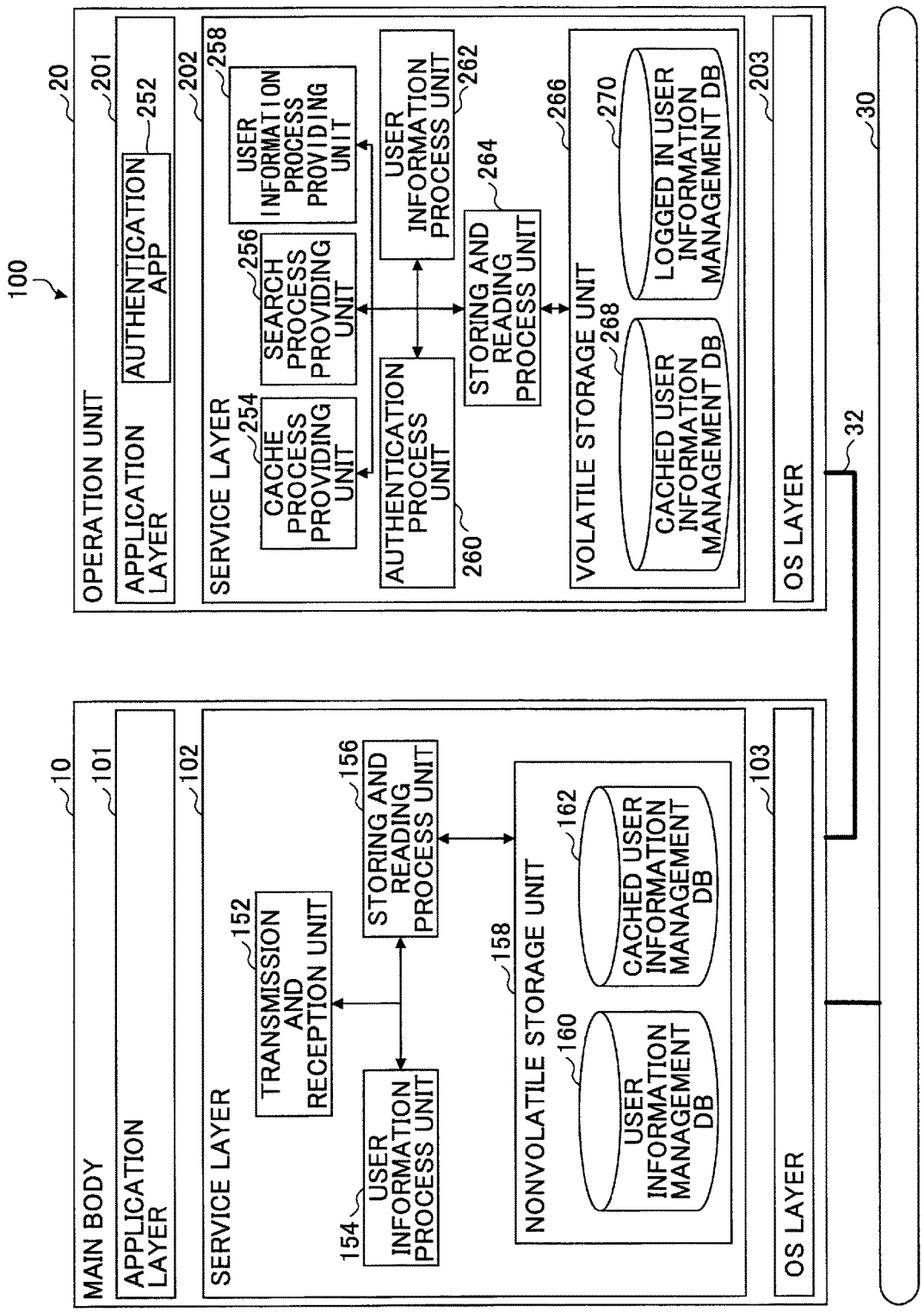

[Fig. 5]

| NO. | USER ID | PASSWORD | AUTHORIZATION INFORMATION | SCREEN CUSTOMIZATION INFORMATION |
|---|---|---|---|---|
| 1 | 01aa | aaaa | ACCESS RIGHT FOR SETTING OF DOCUMENT MANAGER | JAPANESE |
| 2 | 01ab | abab | ACCESS RIGHT FOR SETTING OF NETWORK ADMINISTRATOR | ENGLISH |
| 3 | 01ba | baba | RIGHT TO USE SCANNER APP | FRENCH |
| 4 | 01bb | bbbb | RIGHT TO USE COPYING MACHINE APP | GERMAN |
| ... | ... | ... | ... | ... |

[Fig. 6]

| NO. | USER ID | PASSWORD | AUTHORIZATION INFORMATION | SCREEN CUSTOMIZATION INFORMATION |
|---|---|---|---|---|
| 1 | 01aa | aaaa | ACCESS RIGHT FOR SETTING OF DOCUMENT MANAGER | JAPANESE |
| 3 | 01ba | baba | RIGHT TO USE SCANNER APP | FRENCH |

[Fig. 7]

| NO. | USER ID | PASSWORD | AUTHORIZATION INFORMATION | SCREEN CUSTOMIZATION INFORMATION |
|---|---|---|---|---|
| 1 | 01ca | caca | ACCESS RIGHT FOR SETTING OF DOCUMENT MANAGER | JAPANESE |
| 2 | 01cb | cbcb | RIGHT TO USE PRINTER APP | GERMAN |
| 3 | 01da | dada | RIGHT TO USE FACSIMILE MACHINE APP | ENGLISH |

[Fig. 8]
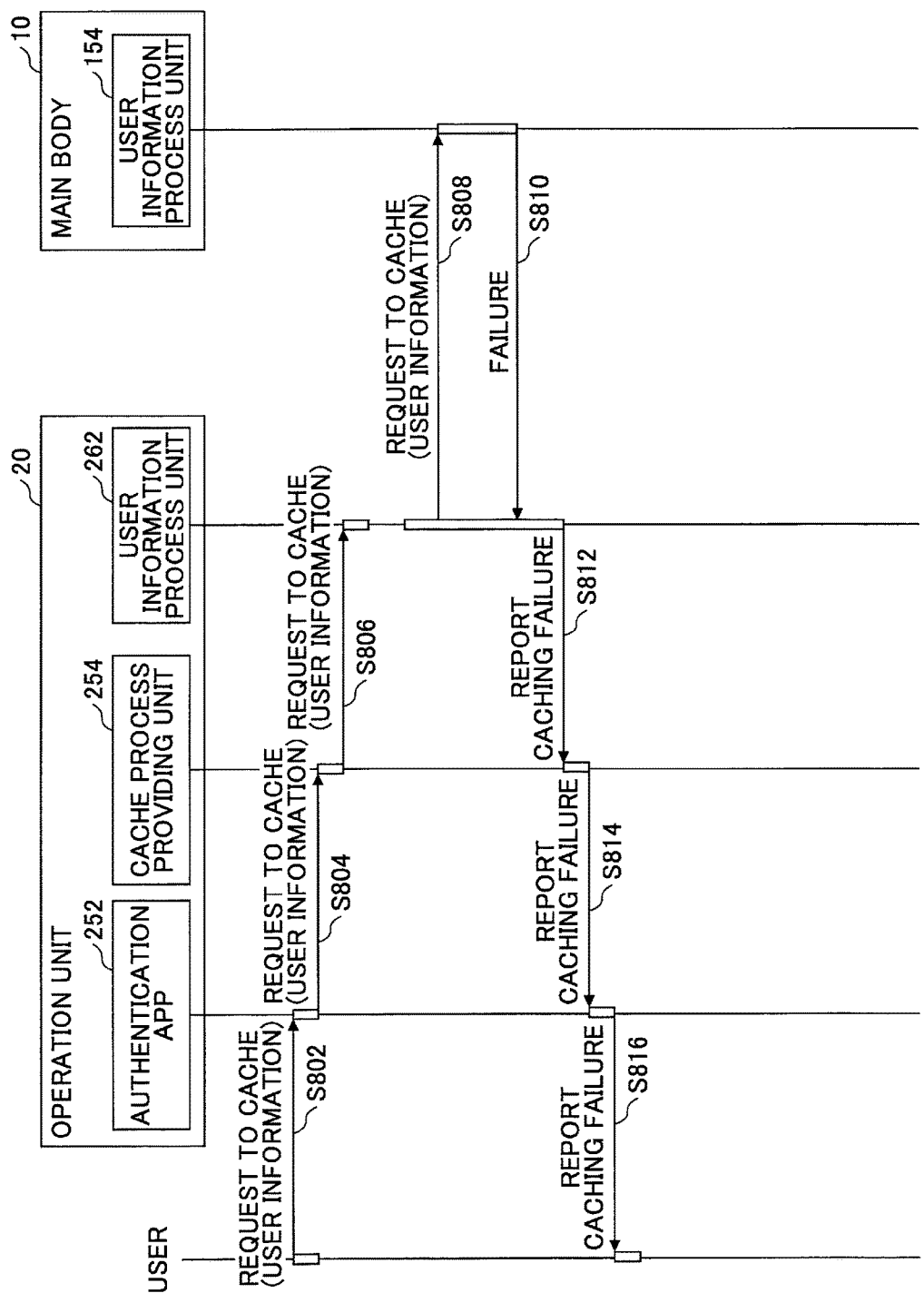

[Fig. 9]
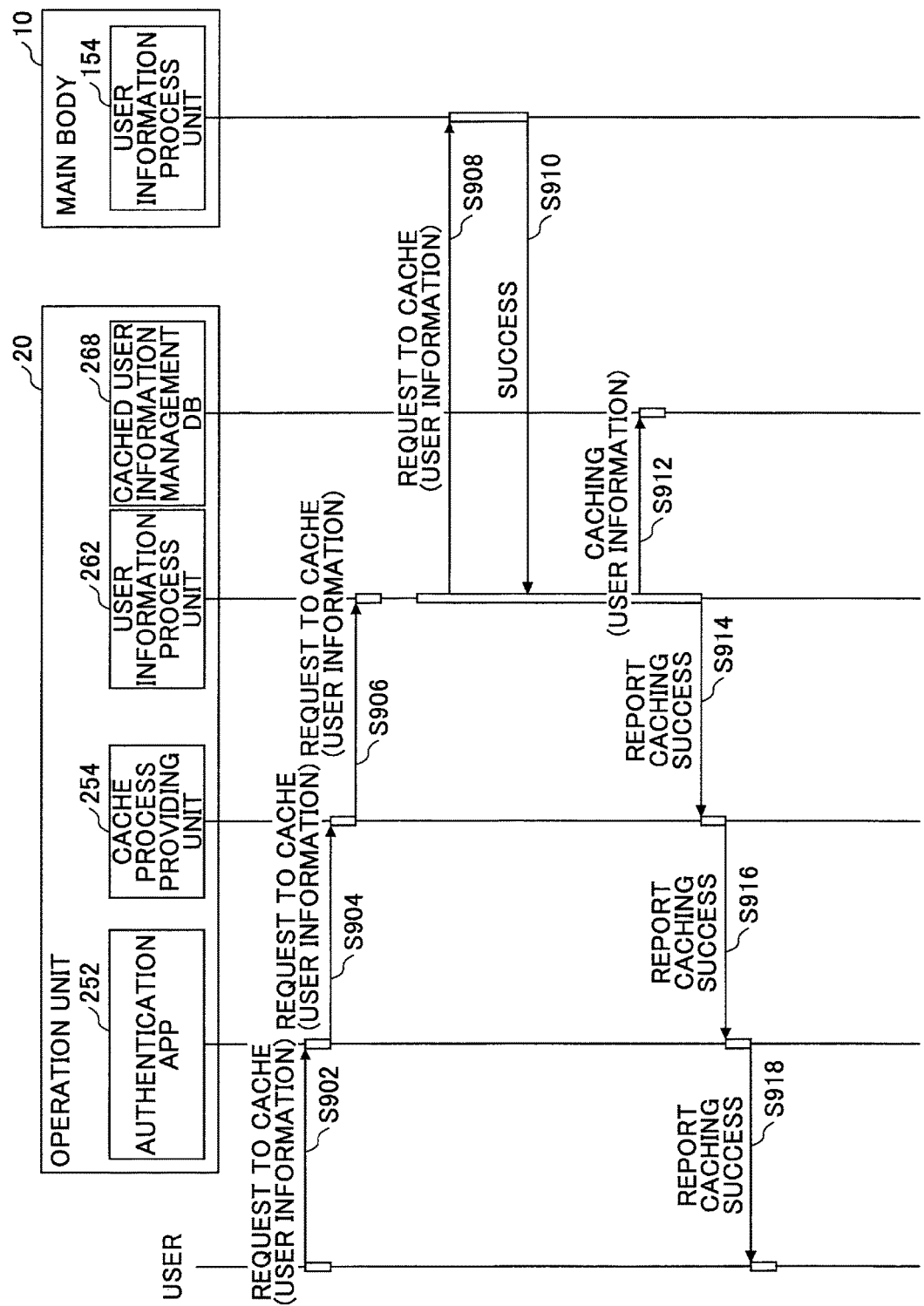

[Fig. 10]
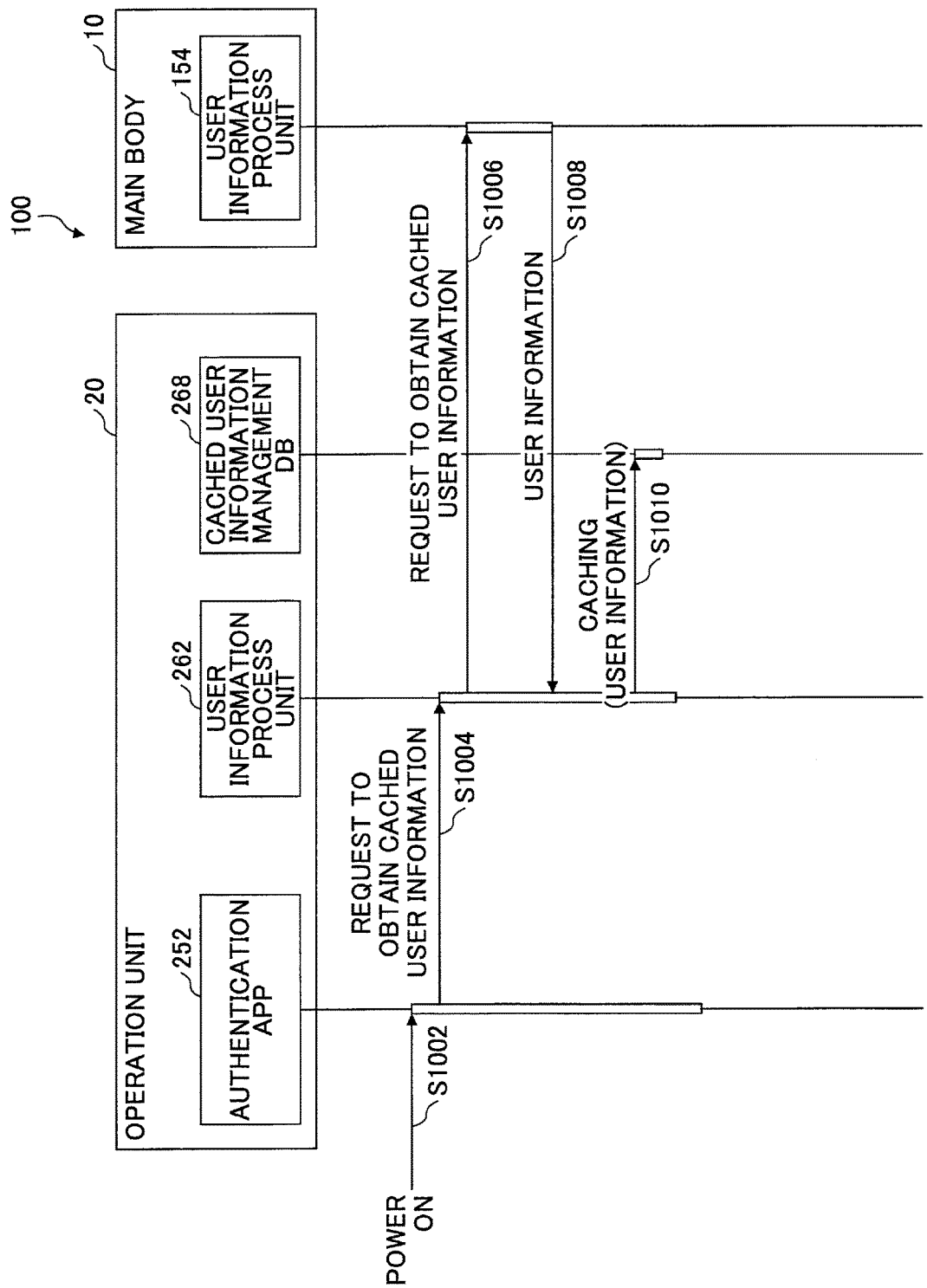

[Fig. 11]
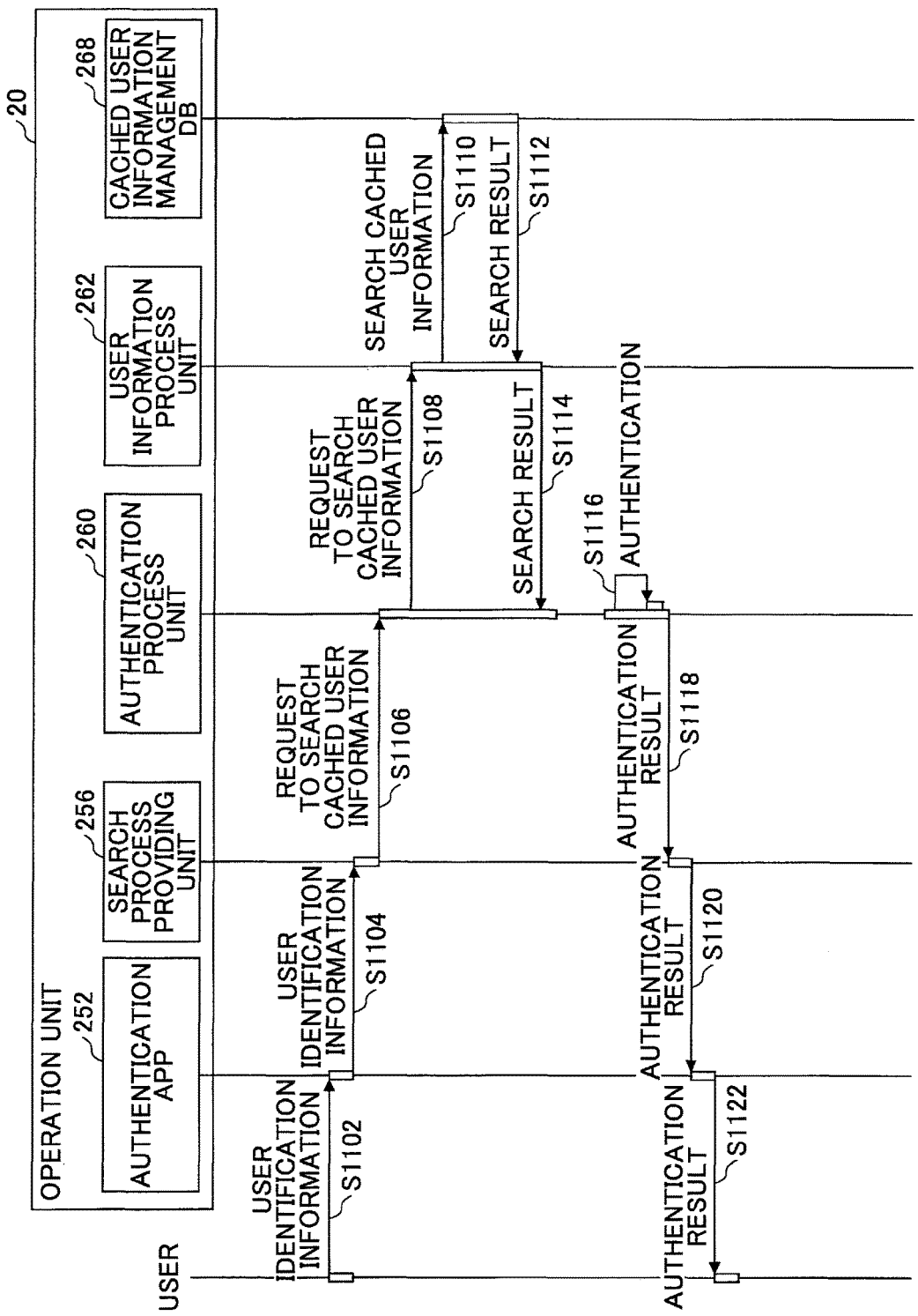

[Fig. 12]
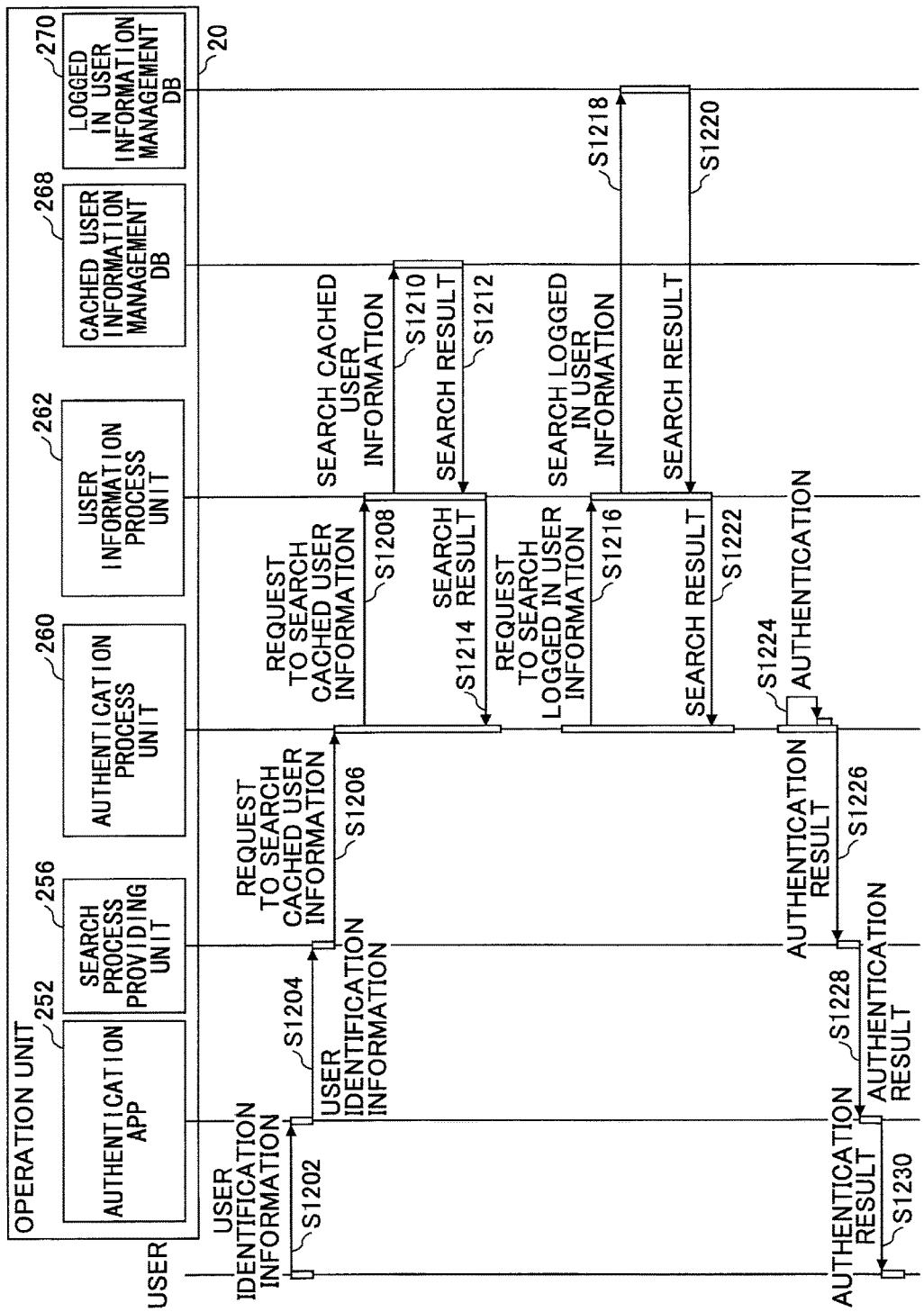

[Fig. 13]
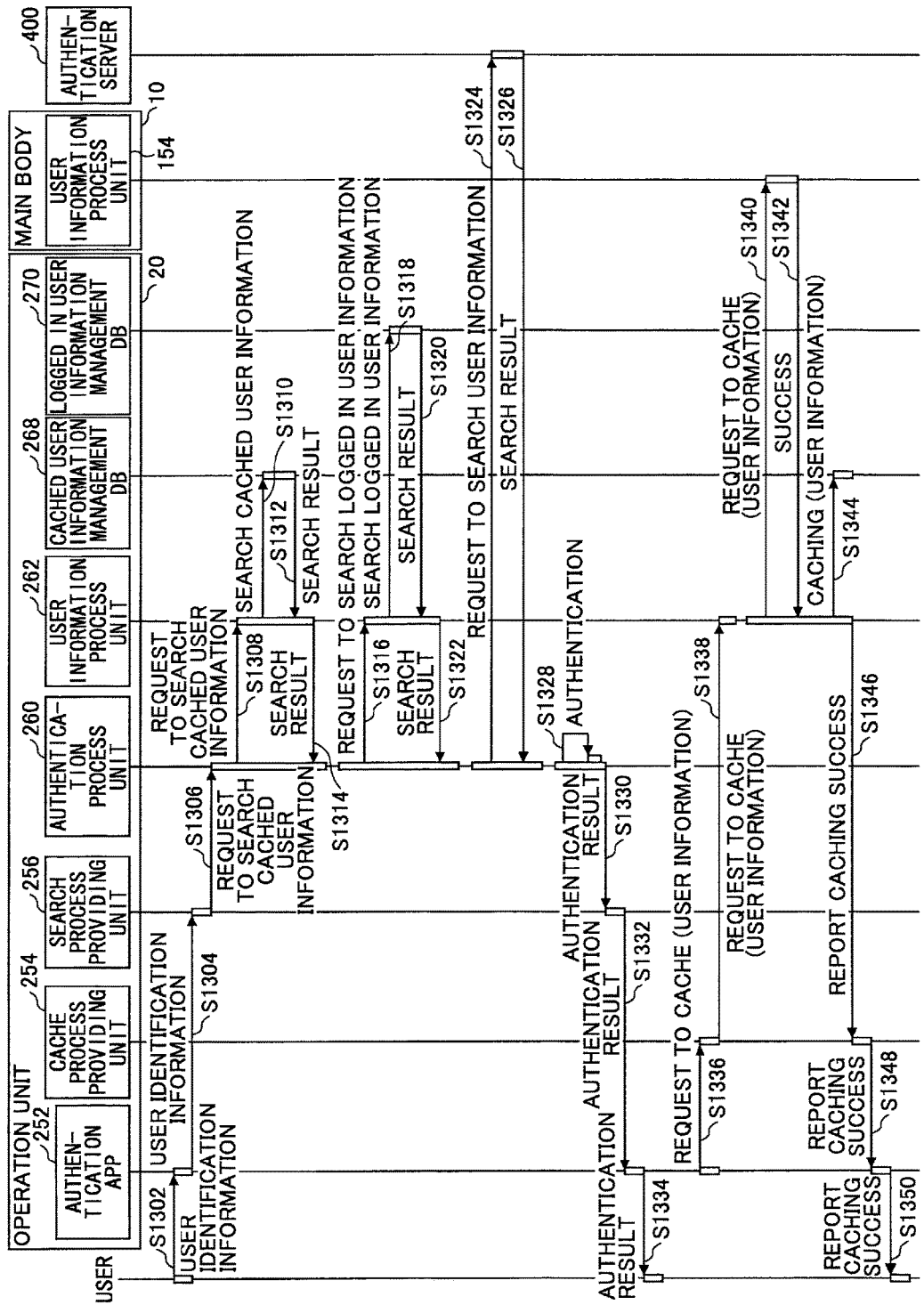

[Fig. 14]
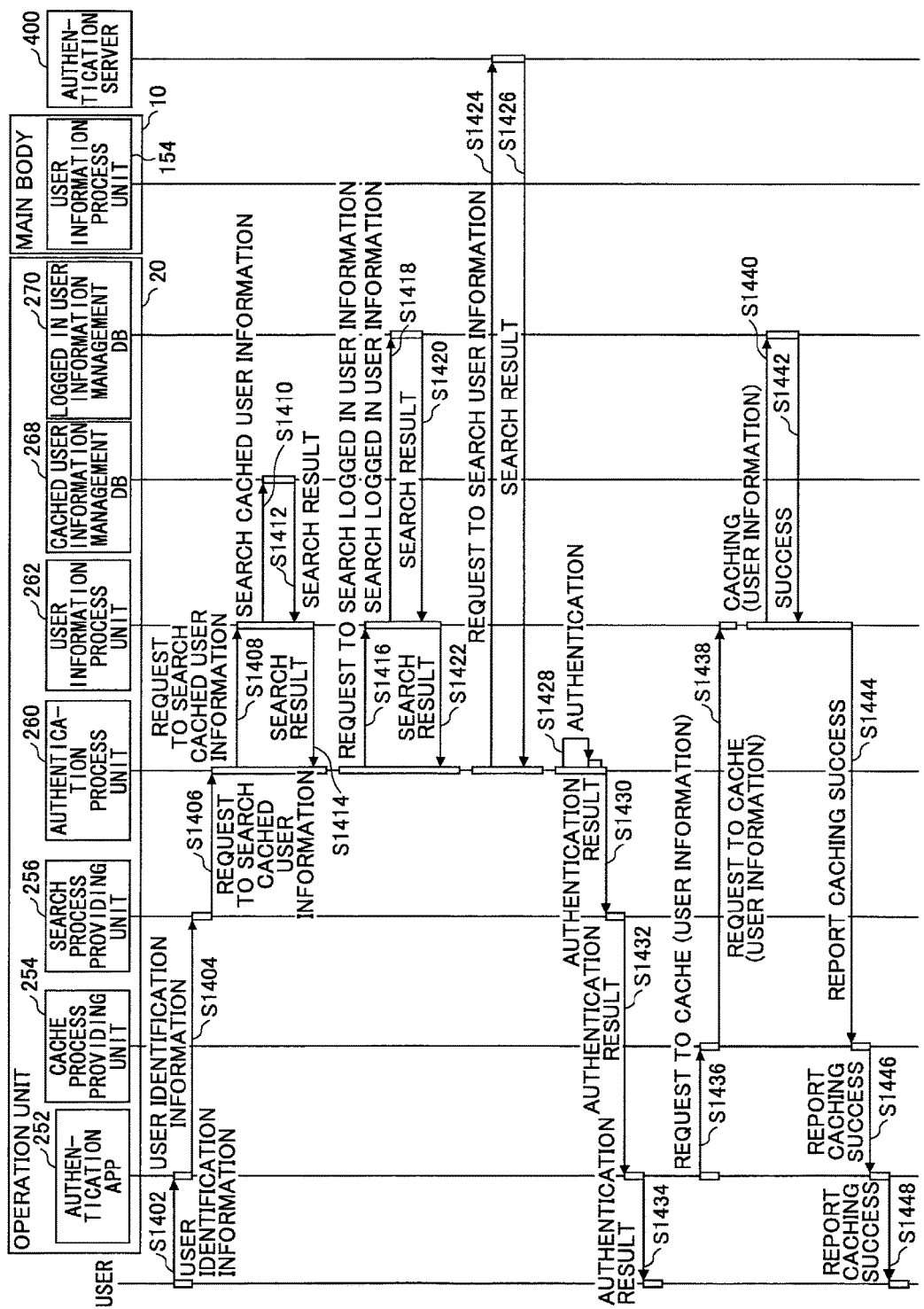

[Fig. 15]
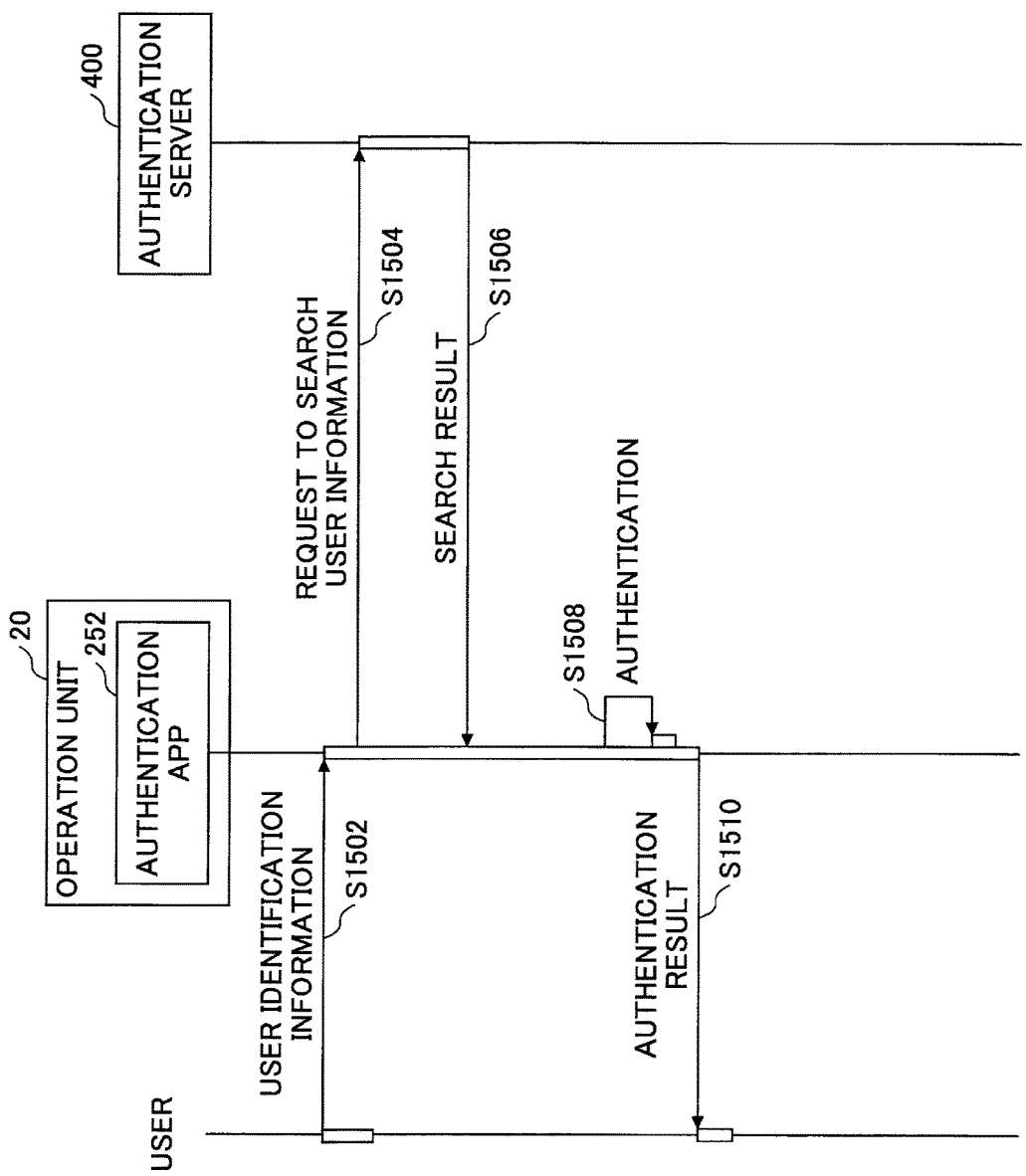

[Fig. 16]
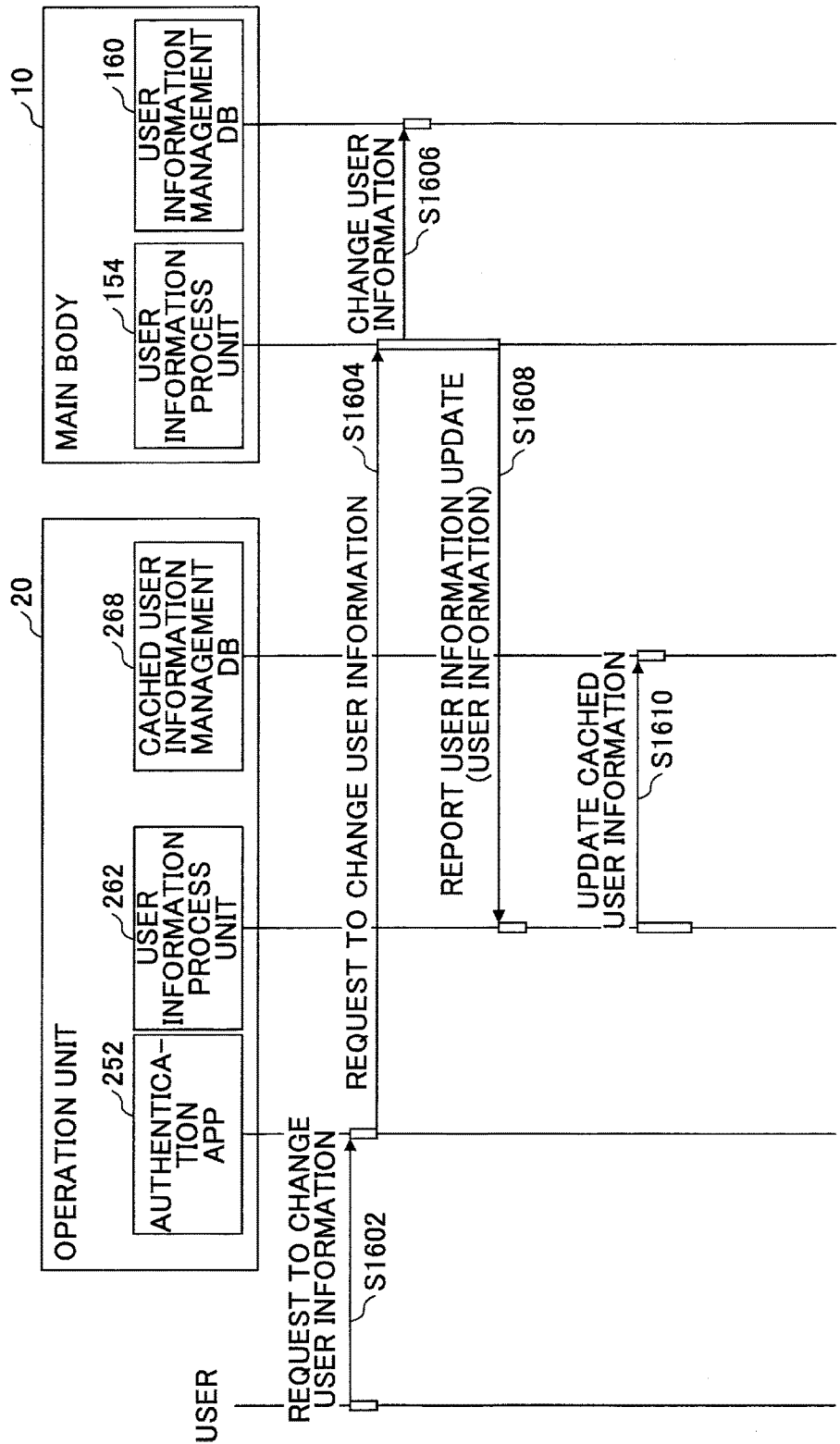

[Fig. 17]
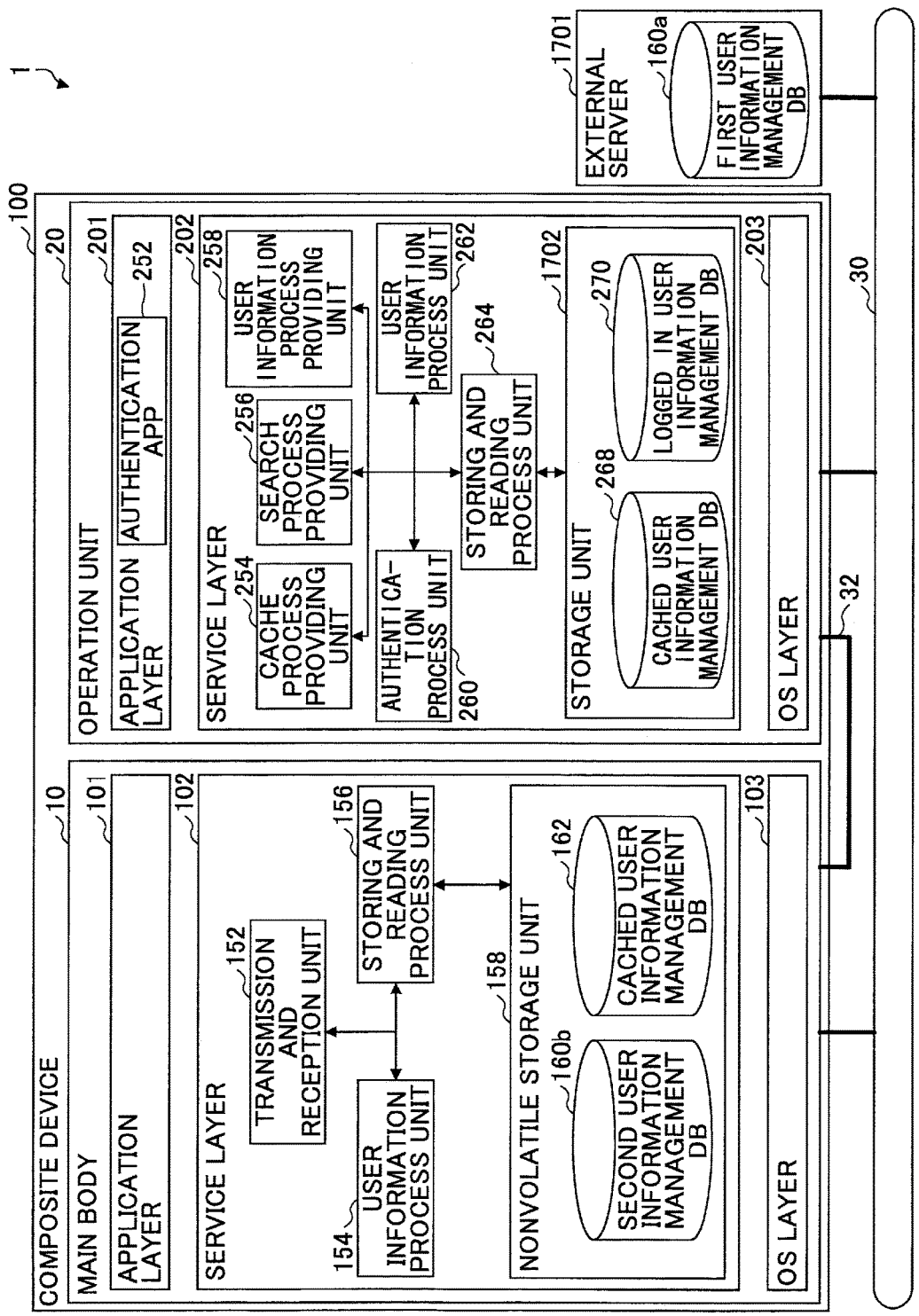

[Fig. 18]
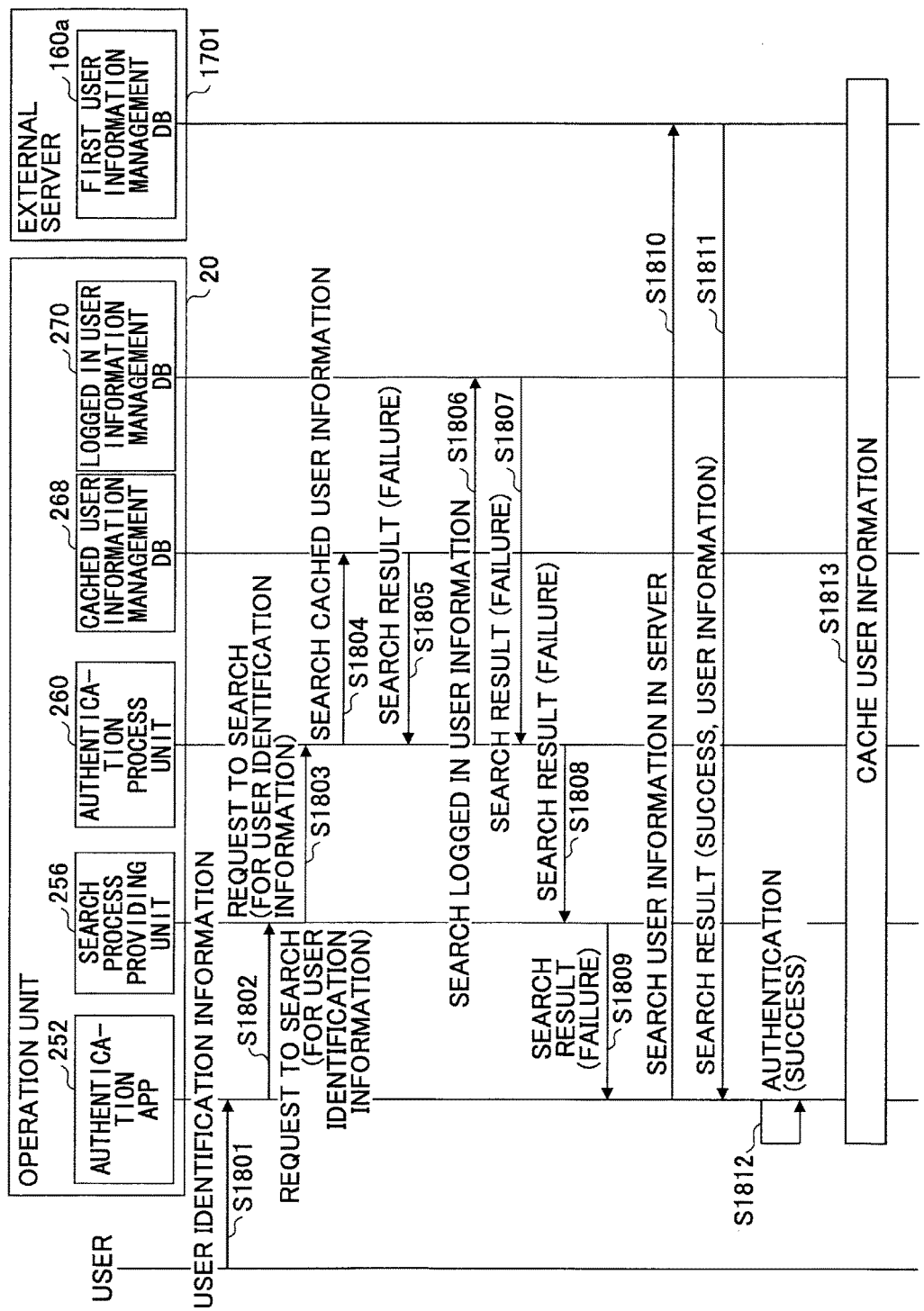

[Fig. 19]
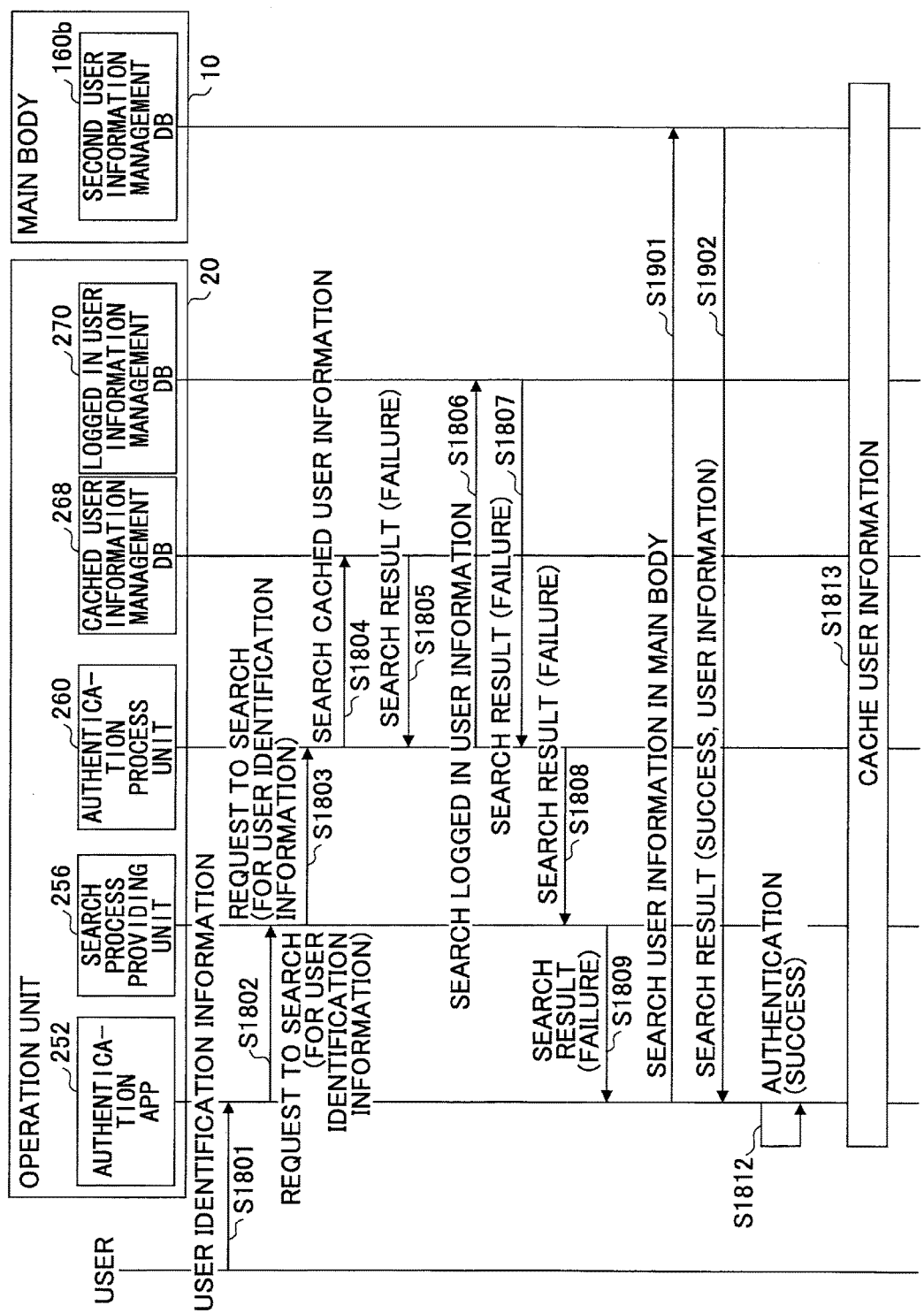

[Fig. 20]
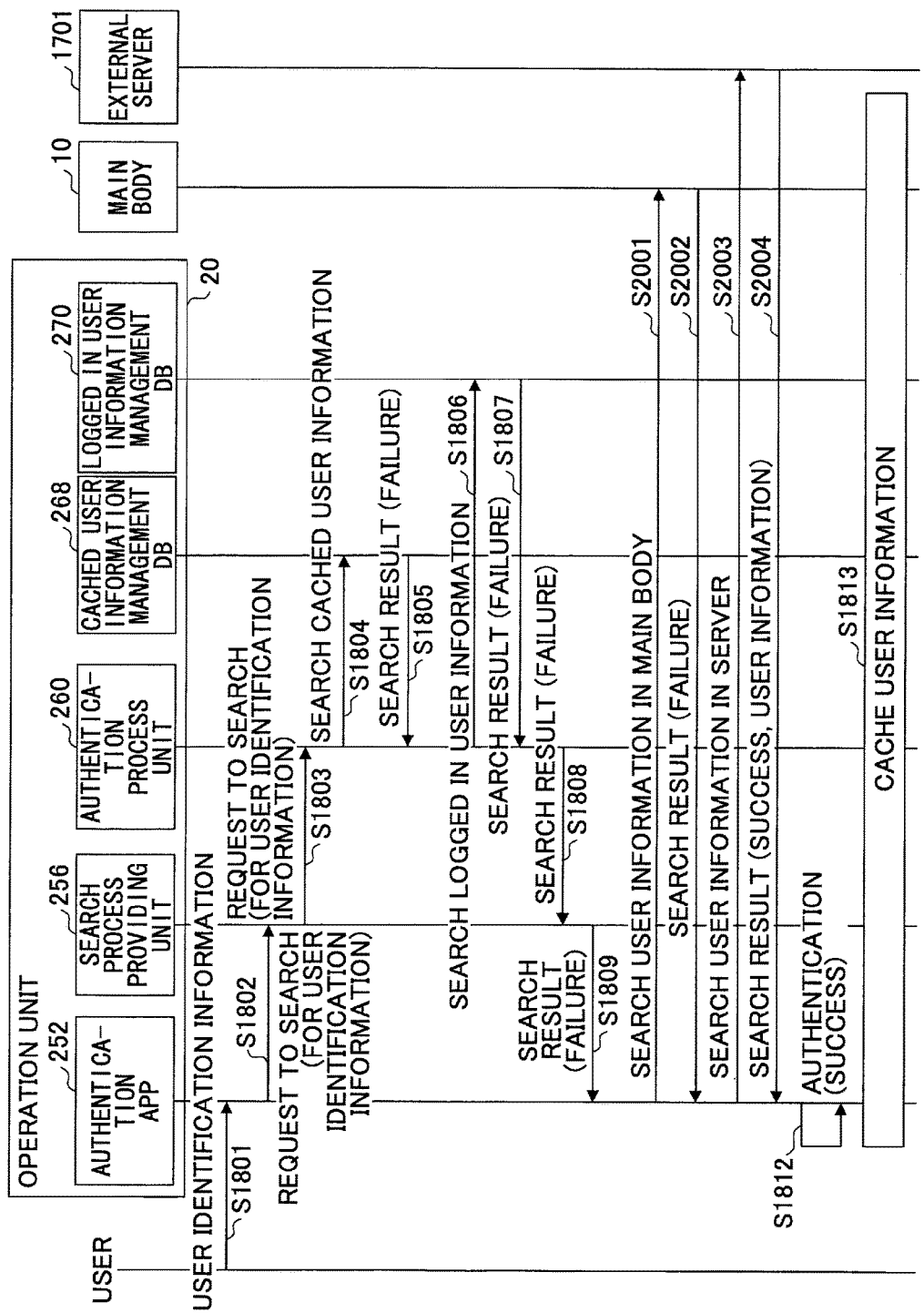

SYSTEM, APPARATUS, AND METHOD FOR ALLOWING A PROGRAM TO CACHE USER INFORMATION

TECHNICAL FIELD

The present invention relates to an information processing system, an image processing apparatus, an information processing method, and a recording medium.

BACKGROUND ART

When a composite device such as a Multi Function Peripheral (MFP) is used, a process to authenticate a user is performed. For example, when the user holds an IC card over the composite device, the composite device reads identification information about the user (hereafter "user identification information") stored in the IC card, and the user identification information is transmitted to an externally disposed authentication server. The authentication server authenticates the user by comparing the user identification information transmitted by the composite device with information about the user (hereafter "user information") managed by the authentication server, the user using the composite device.

Further, if authentication is successful, relevant user information about the user who has been successfully authenticated is obtained from the authentication server and cached in the composite device.

With respect to the composite device, there is a technique of speeding up an authentication process upon the use of the composite device by causing the composite device that the user may use to cache authentication information (see Patent Document 1, for example).

CITATION LIST

Patent Literature

PTL 1: Japanese Laid-Open Patent Publication No. 2010-277557

SUMMARY OF INVENTION

Technical Problem

It is assumed that software vendors are asked to create a program such as an authentication application. For example, the software vendors may use a Software Development Kit (SDK) to create a program such as an authentication application.

In many cases, an authentication processing procedure executed by a created authentication application will be different depending on the software vendors. For example, if an authentication application created by a software vendor that prioritizes speed of an authentication process is executed, information necessary for authentication may be cached. By contrast, if an authentication application created by a software vendor that prioritizes security is executed, information necessary for authentication may not be cached.

In this manner, an authentication processing procedure executed by a created authentication application will be different depending on the software vendors.

Accordingly, it is a general object of the present invention to allow a program to select whether to cache information about a process.

Solution to Problem

In an embodiment of the present invention, an information processing system is provided. The information processing system includes a first storage that stores user information about one or more users of the information processing system; a second storage; a first determining unit that determines, depending on whether a program sets the second storage to store predetermined user information from the user information stored in the first storage, the predetermined user information being used in the program, whether to store the predetermined user information in the second storage; and a user information process unit that obtains the predetermined user information from the user information and stores the predetermined user information in the second storage if the first determining unit determines that the predetermined user information is to be stored in the second storage.

Advantageous Effects of Invention

According to an embodiment of the present invention, it is possible to allow a program to select whether to cache information about a process.

BRIEF DESCRIPTION OF DRAWINGS

FIG. 1 is a diagram showing an information processing system according to an embodiment.

FIG. 2 is a diagram showing a hardware configuration of a composite device according to an embodiment.

FIG. 3 is a diagram showing a software configuration of a composite device according to an embodiment.

FIG. 4 is a functional block diagram of a composite device according to an embodiment.

FIG. 5 is a diagram showing a user information table.

FIG. 6 is a diagram showing a cached user information table.

FIG. 7 is a diagram showing a logged in user information table.

FIG. 8 is a sequence diagram showing an operation (1) of a composite device according to an embodiment.

FIG. 9 is a sequence diagram showing an operation (2) of a composite device according to an embodiment.

FIG. 10 is a sequence diagram showing an operation (3) of a composite device according to an embodiment.

FIG. 11 is a sequence diagram showing an operation (4) of a composite device according to an embodiment.

FIG. 12 is a sequence diagram showing an operation (5) of a composite device according to an embodiment.

FIG. 13 is a sequence diagram showing an operation (6) of a composite device according to an embodiment.

FIG. 14 is a sequence diagram showing an operation (7) of a composite device according to an embodiment.

FIG. 15 is a sequence diagram showing an operation (8) of a composite device according to an embodiment.

FIG. 16 is a sequence diagram showing an operation (9) of a composite device according to an embodiment.

FIG. 17 is a diagram showing a functional configuration of an information processing system according to a third embodiment.

FIG. 18 is a sequence diagram (1) of a user authentication process according to the third embodiment.

FIG. 19 is a sequence diagram (2) of a user authentication process according to the third embodiment.

FIG. 20 is a sequence diagram (3) of a user authentication process according to the third embodiment.

DESCRIPTION OF EMBODIMENTS

In the following, an embodiment of the present invention is described based on examples below with reference to drawings. The examples are used only for illustrative purposes and embodiments of the present invention are not limited to the following examples.

In addition, in all the drawings to describe the examples, the same reference numerals are given to elements with the same functions so that a repetition of descriptions may be omitted.

<Information Processing System>

FIG. 1 is a diagram showing an information processing system according to the present embodiment.

The information processing system includes a composite device 100 and an IC card 300. Examples of the composite device 100 include a printer, a scanner, a copying machine, a facsimile machine, and a Multi Function Peripheral (MFP) having these functions. Further, it is possible to apply the composite device 100 to an image processing apparatus such as a projector and an electronic whiteboard device having image forming functions such as projection and display as well as printing.

The composite device 100 and an authentication server 400 are interconnected via a network 30. While the network 30 is not limited in particular, the network 30 may be configured with a Local Area Network (LAN) based on a transaction protocol such as Ethernet (registered trademark) or Transmission Control Protocol/Internet Protocol (TCP/IP), a Virtual Private Network (VPN), or a Wide Area Network (WAN) connected using a dedicated line.

The IC card 300 supports short-range wireless communication such as NFC and communicates with the composite device 100. The IC card 300 has a built-in IC chip that stores information. In addition to the IC card 300, an IC tag may be used as long as short-range wireless communication is supported.

When the composite device 100 performs short-range wireless communication with the IC card 300, the composite device 100 receives data such as user identification information transmitted by the IC card 300. The composite device 100 processes data transmitted by the IC card 300 by executing a program such as an authentication application. Specifically, when the IC card 300 is held over the composite device 100, the composite device 100 can read the user identification information stored in the IC card 300. The composite device 100 sends a request for authentication to the authentication server 400 by transmitting the user authentication information to the authentication server 400.

Based on the user authentication information transmitted by the composite device 100, the authentication server 400 authenticates a user carrying the IC card 300. The authentication server 400 can perform the authentication by searching registered user information for the user authentication information. The authentication server 400 reports whether the authentication is successful to the composite device 100.

Based on the report of whether the authentication is successful sent by the authentication server 400, the composite device 100 can perform one of functions of a printer, a scanner, a copying machine, and a facsimile machine if the authentication is successful. Further, if the authentication is successful, the composite device 100 can cache user information about the user that has been successfully authenticated.

<Hardware Configuration of Composite Device 100>

FIG. 2 is a diagram showing a hardware configuration of the composite device 100. The composite device 100 includes a main body (execution unit) 10 and an operation unit 20 that receives a user operation. The main body 10 performs various functions (image processing) such as a printer function, a scanner function, a copying machine function, and a facsimile machine function. The main body 10 and the operation unit 20 may be integrated and implemented as the composite device 100 or may be implemented as separate devices. In addition, the reception of a user operation is a concept involving reception of information (such as a signal indicating a coordinate value set on a screen) input depending on the user operation. The main body 10 and the operation unit 20 are communicatively connected to each other via a dedicated communication path 32. For the communication path 32, while an element compliant with a standard such as Universal Serial Bus (USB) may be used, an element compliant with any standard may also be used regardless of whether it is wired or wireless.

Further, the main body 10 can perform an action depending an operation received by the operation unit 20. The main body 10 can communicate with an external device such as a client Personal Computer (PC) and perform an action in response to an instruction received from the external device.

First, a hardware configuration of the main body 10 is described. As shown in FIG. 2, the main body 10 includes a CPU 11, a ROM 12, a RAM 13, a Hard Disk Drive (HDD) 14, a communication Interface (I/F) 15, a connection I/F 16, and an engine unit 17, all being interconnected via a system bus 18.

The CPU 11 comprehensively controls operations of the main body 10. The CPU 11 controls entire operations of the main body 10 by executing a program for the main body 10 stored in the ROM 12 or the HDD 14 while using the RAM 13 as a work area and implements various functions including the printer function, the scanner function, the copying machine function, and the facsimile machine function as mentioned above.

The communication I/F 15 is an interface for connecting to the network 30. The connection I/F 16 is an interface for communicating with the operation unit 20 via the communication path 32.

The engine unit 17 is hardware to perform a process to implement the printer function, the scanner function, the copying machine function, and the facsimile machine function other than a typical information process or communication. For example, the engine unit 17 includes a scanner (image reading unit) that reads an image on a manuscript by scanning the image, a plotter (image forming unit) that performs printing on a sheet of material such as paper, and a facsimile unit that performs facsimile communication. Further, the engine unit 17 may also include a specific option such as a finisher that sorts printed sheets and an Automatic Document Feeder (ADF) that automatically feeds paper.

In the following, a hardware configuration of the operation unit 20 is described. As shown in FIG. 2, the operation unit 20 includes a CPU 21, a ROM 22, a RAM 23, a flash memory 24, a communication I/F 25, a connection I/F 26, an operation panel 27, an external connection I/F 28, and a card reader/writer 31 interconnected via a system bus 29.

The CPU 21 comprehensively controls operations of the operation unit 20. The CPU 21 controls entire operations of the operation unit 20 by executing a program for the operation unit 20 stored in the ROM 22 or the flash memory 24 while using the RAM 23 as a work area and implements various functions such as display of information (image) in response to an input received from a user.

The communication I/F 25 is an interface for connecting to the network 30. The connection I/F 26 is an interface for communicating with the main body 10 via the communication path 32.

The operation panel 27 receives various inputs depending on a user operation and displays various types of information (such as information depending on a received operation, information indicating an operation status of the composite device 100, and information indicating a setting status). In this example, although the operation panel 27 is configured with a Liquid Crystal Display (LCD) device having a touch panel function, the operation panel 27 is not limited to this. For example, the operation panel 27 may be configured with an organic Electro Luminescence (EL) display device having a touch panel function, for example. Further, in addition to or instead of this, it is possible to dispose an operation unit with hardware keys or a display unit with lamps.

The external connection I/F 28 is an interface for connecting to an external device.

The card reader/writer 31 performs short-range wireless communication with the IC card 300.

<Software Configuration of Composite Device 100>

FIG. 3 is a diagram showing a software configuration of the composite device 100.

As shown in FIG. 3, the main body 10 includes an application layer 101, a service layer 102, and an Operating System (OS) layer 103. The application layer 101, the service layer 102, and the OS layer 103 are programs such as various types of software stored in the ROM 12 or the HDD 14. Various functions are provided when the CPU 11 executes these types of software.

The software of the application layer 101 is an application program (this may be simply called "app" in the following descriptions) for operating a hardware resource to provide a predetermined function. Examples of the app include a copying machine app for providing a copying machine function, a scanner app for providing a scanner function, a facsimile machine app for providing a facsimile machine function, and a printer app for providing a printer function.

The software of the service layer 102 is present between the application layer 101 and the OS layer 103. The software of the service layer 102 is for providing the app of the application layer 101 with an interface to use a hardware resource included in the main body 10. Specifically, the software of the service layer 102 provides functions of receiving an operation request to the hardware resource and arbitrating between operation requests. Examples of the operation requests that the service layer 102 receive include requests for reading by a scanner and printing by a plotter.

In addition, the functions of the interface by the service layer 102 are provided not only to the application layer 101 of the main body 10 but also to an application layer 201 of the operation unit 20. In other words, the application layer 201 (app) of the operation unit 20 can also implement a function that uses the hardware resource of the main body 10 (such as the engine unit 17 and the ROM 12) via the interface function of the service layer 102.

The software of the OS layer 103 is basic software (operating system) for providing basic functions to control hardware included in the main body 10. The software of the service layer 102 converts use requests for the hardware resource from various apps into commands interpretable for the OS layer 103 and passes the commands to the OS layer 103. When the software of the OS layer 103 executes the commands, the hardware resource performs operations in accordance with the requests from the apps.

The operation unit 20 includes the application layer 201, a service layer 202, and an OS layer 203 in the same manner. The application layer 201, the service layer 202, and the OS layer 203 included in the operation unit 20 have the same hierarchical structure as in the main body 10. However, functions provided by apps of the application layer 201 and types of operation requests that can be received by the service layer 202 are different from those in the main body 10. Although apps of the application layer 201 may be software for operating a hardware resource included in the operation unit 20 in order to provide a predetermined function, the apps are mainly programs for providing a user interface (UI) function that performs a display and an operation of the functions included in the main body 10 (such as the copying machine function, the scanner function, the facsimile machine function, and the printer function). Further, the apps of the application layer 201 may use data such as user identification information which is transmitted by the IC card 300 and is read by the card reader/writer 31. Examples of the apps of the application layer 201 include a program such as an authentication app 252 that uses the user authentication information transmitted by the IC card 300.

The software of the service layer 202 is present between the application layer 201 and the OS layer 203. The software of the service layer 202 is for providing the app of the application layer 201 with an interface to use a hardware resource included in the operation unit 20. Specifically, the software of the service layer 202 provides functions of receiving an operation request for the hardware resource and arbitrating between operation requests. Examples of the operation requests that the service layer 202 receive include requests for authentication by searching for user identification information read by the card reader/writer 31 and requests for caching user information used in an authentication process or user information about a user that has been successfully authenticated.

In addition, the functions of the interface by the service layer 202 are provided not only to the application layer 201 of the operation unit 20 but also to the application layer 101 of the main body 10. In other words, the application layer 101 of the main body 10 can also implement a function that uses the hardware resource of the operation unit 20 (such as the ROM 22, the RAM 23, and the flash memory 24) via the interface function of the service layer 202.

The software of the OS layer 203 is basic software (operating system) for providing basic functions to control hardware included in the operation unit 20. The software of the service layer 202 converts use requests for the hardware resource from various apps into commands interpretable for the OS layer 203 and passes the commands to the OS layer 203. When the software of the OS layer 203 executes the commands, the hardware resource performs operations in accordance with the requests from the apps.

In the present embodiment, in order to maintain independence of the functions, the software of the OS layer 103 on the main body 10 and the software of the OS layer 203 on the operation unit 20 are different from each other. In other words, the main body 10 and the operation unit 20 operate independently of each other with different operating systems. For example, it is possible to use Linux (registered trademark) as the software of the OS layer 103 on the main body 10 and use Android (registered trademark) as the software of the OS layer 203 on the operation unit 20.

As mentioned above, since the main body 10 and the operation unit 20 operate based on different operating systems in the composite device 100 of the present embodiment, communication between the main body 10 and the operation unit 20 is performed as communication between different devices rather than interprocess communication within a common device. Examples of such communication includes an operation of sending received information by the operation unit 20 (contents of an instruction from a user) to the main body 10 (command communication) and an operation of reporting an event by the main body 10 to the operation unit 20. In this case, the operation unit 20 can use functions of the main body 10 by performing command communication with the main body 10. Further, examples of the event reported by the main body 10 to the operation unit 20 include progress of an operation in the main body 10 and settings in the main body 10.

Further, in the present embodiment, since power is supplied to the operation unit 20 from the main body 10 via the communication path 32, it is possible to perform power control on the operation unit 20 separately from (independently of) power control on the main body 10.

<Functional Configuration of Composite Device 100>
(Functional Configuration of Main Body 10)

In the following, a functional configuration of the composite device 100 is described. FIG. 4 is a functional block diagram showing the functional configuration of the composite device 100. In FIG. 4, while functions according to the present invention are mainly shown for convenience sake, the functions of the composite device 100 are not limited to the following functions.

The service layer 102 of the main body 10 in the composite device 100 includes a transmission and reception unit 152, a user information process unit 154, and a storing and reading process unit 156. Each of the units is a function or a unit implemented when any one of constituent elements shown in FIG. 2 operates by an instruction from the CPU 11 in accordance with the program for the main body 10 stored in the ROM 12 or the HDD 14 shown in FIG. 2. Further, the main body 10 of the composite device 100 includes a nonvolatile storage unit 158 that maintains various types of data and information even if the composite device 100 is powered off, the nonvolatile storage unit 158 being configured with the HDD 14 shown in FIG. 2.

(User Information Table)

In the nonvolatile storage unit 158, a user information management Data Base (DB) 160 having a user information table as shown in FIG. 5 is constructed. In the user information table, identification information (No.) about user information, a user ID, a password, authorization information, and screen customization information are associated and managed. The user information is information about a user allowed to use the composite device 100. The user information may be managed in the authentication server 400 or in the main body 10 of the composite device 100. If the user information is managed in the main body 10 of the composite device 100, the user information is registered with the user information management DB 160 in advance. The user ID refers to identification information such as an ID to identify a user. The password is a string of characters and numbers to be input for log-in with the user ID. The authorization information refers to information indicating functions available to the user if the user logs in after successful authentication. Examples of authorization include an access right for a predetermined setting such as an access right for a setting of a document manager or an access right for a setting of a network administrator, and a right to use a function of a predetermined app such as a right to use a copying machine app, a right to use a scanner app, or a right to use a color mode or a full-color mode. The screen customization information refers to setting information to customize content to be displayed in the liquid crystal display device of the operation panel 27 for the user that has logged in. Examples of the screen customization information include information about arrangement of icons displayed in a home screen, information about a language used for display, and wallpaper information.

(Cached User Information Table)

In the nonvolatile storage unit 158, a cached user information management DB 162 having a cached user information table as shown in FIG. 6 is constructed. The cached user information table stores user information about a user cached in the operation unit 20 from user information stored in the user information table in the user information management DB 160. FIG. 6 shows that from the user information stored in the user information table shown in FIG. 5, user information about users indicated by No. 1 and No. 3 is cached in the operation unit 20.

Returning to FIG. 4, the transmission and reception unit 152 of the main body 10 is implemented by an instruction from the CPU 11 shown in FIG. 2 and the communication I/F 15 and the connection I/F 16 shown in FIG. 2. The transmission and reception unit 152 transmits and receives various types of data (or information) to and from another terminal, a device, or a server via the network 30 and transmits and receives various types of data (or information) to and from the operation unit 20 via the communication path 32.

The storing and reading process unit 156 of the main body 10 is implemented by an instruction from the CPU 11 and the HDD 14 shown in FIG. 2. The storing and reading process unit 156 performs a process to store various types of data in the nonvolatile storage unit 158 and a process to read various types of data stored in the nonvolatile storage unit 158.

The user information process unit 154 of the main body 10 is implemented by an instruction from the CPU 11 shown in FIG. 2. When the authentication app 252 is executed by the operation unit 20, the user information process unit 154 stores user information about users that have been successfully authenticated in the user information management DB 160 of the nonvolatile storage unit 158 in accordance with an instruction of the operation unit 20. Further, from the user information about users stored in the user information management DB 160 of the nonvolatile storage unit 158, the user information process unit 154 stores user information about a user cached in the operation unit 20 in the cached user information management DB 162 of the nonvolatile storage unit 158.

Further, in response to a request from the authentication app 252 of the operation unit 20, the user information process unit 154 reports the user information stored in the user information management DB 160 to the authentication app 252. For example, the user information process unit 154 searches for user information that corresponds to user identification information included in a search request sent from the authentication app 252 and reports retrieved user information to the authentication app 252.

(Functional Configuration of Operation Unit 20)

The service layer 202 of the operation unit 20 in the composite device 100 includes a cache process providing unit 254, a search process providing unit 256, a user information process providing unit 258, an authentication process unit 260, a user information process unit 262, and a storing and reading process unit 264. Each of the units is a function or a unit implemented when any one of the constituent elements shown in FIG. 2 operates by an instruction from the CPU 21 in accordance with a program such as the authentication app 252 stored in the ROM 22 or the flash memory 24 shown in FIG. 2. Further, the operation unit 20 of the composite device 100 includes a volatile storage unit 266 that deletes various types of data and information when the composite device 100 is powered off, the volatile storage unit 266 being configured with the RAM 23 shown in FIG. 2.

(Cached User Information Table)

In the volatile storage unit 266, a cached user information management DB 268 having a cached user information table is constructed as shown in FIG. 6.

(Logged in User Information Table)

In the volatile storage unit 266, a logged in user information management DB 270 having a logged in user information table as shown in FIG. 7 is constructed. The logged in user information table stores user information about users that have logged in.

Returning to FIG. 4, the authentication process unit 260 of the operation unit 20 is implemented by an instruction from the CPU 21 shown in FIG. 2 and functions when the CPU 21 executes the authentication app 252. Based on user identification information read by the card reader/writer 31, the authentication process unit 260 sends, to the user information process unit 262, an instruction to search user information stored in the cached user information management DB 268 constructed in the volatile storage unit 266.

If a search result reported from the user information process unit 262 indicates that the user identification information corresponds to any one of sets of the user information about users stored in the cached user information management DB 268, the authentication process unit 260 determines that authentication is successful and permits a user to log in.

By contrast, if the search result reported from the user information process unit 262 indicates that the user identification information does not correspond to any one of the sets of the user information stored in the cached user information management DB 268, the authentication process unit 260 sends, to the user information process unit 262, an instruction to search user information about users stored in the user information management DB 160 constructed in the nonvolatile storage unit 158 of the main body 10.

If a search result reported from the user information process unit 262 indicates that the user identification information corresponds to any one of sets of the user information about users stored in the user information management DB 160, the authentication process unit 260 determines that authentication is successful and permits the user to log in.

By contrast, if the search result reported from the user information process unit 262 indicates that the user identification information does not correspond to any one of the sets of the user information stored in the user information management DB 160, the authentication process unit 260 requests authentication by transmitting the user identification information from the communication I/F 25 to the authentication server 400. If the authentication server 400 reports that authentication is successful, the authentication process unit 260 permits the user to log in. By contrast, if the authentication server 400 reports that authentication has failed, the authentication process unit 260 does not permit the user to log in. Further, when the authentication server 400 reports that authentication is successful, the authentication process unit 260 obtains user information about the user. Then the authentication process unit 260 sends, to the user information process unit 262, an instruction to cache the user information about the user in the main body 10.

The user information process unit 262 of the operation unit 20 is implemented by an instruction from the CPU 21 shown in FIG. 2. If the authentication process unit 260 sends the request to search the user information about users stored in the cached user information management DB 268, the user information process unit 262 determines whether the user identification information corresponds to any one of sets of the user information and reports a determination result to the authentication process unit 260. Further, when the authentication app 252 is executed, the user information process unit 262 sends, to the user information process unit 154 of the main body 10, an instruction to store user information about a user that has been successfully authenticated in the user information management DB 160 of the nonvolatile storage unit 158 of the main body 10. When the user information process unit 262 receives, from the user information process unit 154 of the main body 10, a report that the user information is stored, the user information process unit 262 stores the user information in the cached user information management DB 268 of the volatile storage unit 266. Further, in user information management DB 270 of the volatile storage unit 266, the user information process unit 262 can store user information about a user that has logged in.

The storing and reading process unit 264 of the operation unit 20 is implemented by an instruction from the CPU 21, the ROM 22, the RAM 23, and the flash memory 24 shown in FIG. 2. The storing and reading process unit 264 stores various types of data in the volatile storage unit 266 and reads various types of data stored in the volatile storage unit 266.

The cache process providing unit 254 of the operation unit 20 is implemented by an instruction from the CPU 21 shown in FIG. 2. The cache process providing unit 254 externally provides an I/F capable of caching when the authentication app 252 uses an Application Programming Interface (API). Since this I/F is provided in a form of SDK, when a software vendor creates the authentication app 252, the software vendor can use the SDK to set the use of the API. The CPU 21 that executes the authentication app 252 causes the user information process unit 262 to function by causing the cache process providing unit 254 to function. The cache process providing unit 254 reports a result of a process by the user information process unit 262 to a user via the operation panel 27.

The search process providing unit 256 of the operation unit 20 is implemented by an instruction from the CPU 21 shown in FIG. 2. The search process providing unit 256 externally provides an I/F capable of searching the cached user information management DB 268 to determine whether user identification information read by the card reader/writer 31 corresponds to any one of sets of user information about users stored in the cached user information management DB 268 constructed in the volatile storage unit 266 when the authentication app 252 uses the API. Since this I/F is provided in a form of SDK, when the software vendor creates the authentication app 252, the software vendor can use a software development kit to set the use of the API. The CPU 21 that executes the authentication app 252 causes the authentication process unit 260 to function by causing the search process providing unit 256 to function. The search process providing unit 256 reports a result of a process by the authentication process unit 260 to the user via the operation panel 27.

The user information process providing unit 258 of the operation unit 20 is implemented by an instruction from the CPU 21 shown in FIG. 2. The user information process providing unit 258 externally provides an I/F capable of storing user information about a user that has been successfully authenticated and logged in in the volatile storage unit 266 when the authentication app 252 uses the API. In accordance with this, it is possible to temporarily store the user information about the user that has logged in. This user information is stored in the logged in user information management DB 270 of the volatile storage unit 266. Since this I/F is provided in a form of SDK, when the software vendor creates the authentication app 252, the software vendor can use a software development kit to set the use of the API. The CPU 21 that executes the authentication app 252 causes the user information process unit 262 to store the user information about the user that has logged in in the volatile storage unit 266 by causing the user information process providing unit 258 to function.

First Embodiment

<Operation (1) of Information Processing System>

FIG. 8 shows an operation (1) of the information processing system.

In FIG. 8, a process to cache user information in the nonvolatile storage unit 158 of the main body 10 in the composite device 100 is performed but the caching fails.

When the CPU 21 executes the authentication app 252, the cache process providing unit 254 functions and can cache the user information.

In step S802, a user sends a request to cache user information to the composite device 100. For example, the user connects an information terminal device such as a PC that stores the user information to the composite device 100 and sends the request to cache the user information to the composite device 100.

In step S804, when the CPU 21 of the operation unit 20 executes the authentication app 252, the CPU 21 sends the request to cache the user information to the cache process providing unit 254.

In step S806, the cache process providing unit 254 of the operation unit 20 sends the request to cache the user information to the user information process unit 262.

In step S808, the user information process unit 262 of the operation unit 20 sends the request to cache the user information to the user information process unit 154 of the main body 10. The user information process unit 154 of the main body 10 performs a process to cache the user information in the user information management DB 160 of the nonvolatile storage unit 158 but the caching has failed. Examples of a reason of not being able to cache include a case where memory usage of the nonvolatile storage unit 158 has reached an upper limit, a case where a size of the user information to be cached is too large, and a case where the user information management DB 160 of the nonvolatile storage unit 158 is currently being accessed.

In step S810, the user information process unit 154 of the main body 10 reports that the caching has failed to the user information process unit 262 of the operation unit 20. For example, the user information process unit 154 of the main body 10 reports if the user information process unit 154 performed the caching process a plurality of times but the caching resulted in failure. In this case, the user information process unit 154 of the main body 10 can also report a reason of not being able to cache in addition to the report of the failure of the caching.

In step S812, the user information process unit 262 of the operation unit 20 reports that the caching has failed to the cache process providing unit 254. In this case, the user information process unit 262 of the operation unit 20 can also report the reason of not being able to cache in addition to the report of the failure of the caching.

In step S814, the cache process providing unit 254 of the operation unit 20 reports that the caching has failed to the CPU 21 of the operation unit 20, the CPU 21 executing the authentication app 252. In this case, the cache process providing unit 254 of the operation unit 20 can also report the reason of not being able to cache in addition to the report of the failure of the caching.

In step S816, the CPU 21 of the operation unit 20, the CPU 21 executing the authentication app 252, reports that the caching has failed to the operation panel 27. In this case, the CPU 21 of the operation unit 20, the CPU 21 executing the authentication app 252, can also report the reason of not being able to cache in addition to the report of the failure of the caching. When the failure of the caching is reported, the failure of the caching is displayed in the operation panel 27. In accordance with this, the user can understand that the caching of the user information has failed. Further, when the reason of not being able to perform caching is reported, it is possible for the user to make an appropriate response for successful caching.

<Operation (2) of Information Processing System>

FIG. 9 shows an operation (2) of the information processing system.

In FIG. 9, a process to cache user information in the nonvolatile storage unit 158 of the main body 10 in the composite device 100 is performed and the caching is successful.

When the CPU 21 executes the authentication app 252, it is possible to cache the user information or to cause the cache process providing unit 254 to function.

Steps S902 to S908 may use steps S802 to S808 shown in FIG. 8.

In step S910, the user information process unit 154 of the main body 10 reports that the caching has been successfully performed to the user information process unit 262 of the operation unit 20.

In step S912, the user information process unit 262 of the operation unit 20 caches the user information in the cached user information management DB 268 of the volatile storage unit 266. In accordance with this, if the user information is cached in the main body 10, the same user information is cached in the operation unit 20.

In step S914, the user information process unit 262 of the operation unit 20 reports that the caching has been successfully performed to the cache process providing unit 254.

In step S916, the cache process providing unit 254 of the operation unit 20 reports that the caching has been successfully performed to the CPU 21 of the operation unit 20, the CPU 21 executing the authentication app 252.

In step S918, the CPU 21 of the operation unit 20, the CPU 21 executing the authentication app 252, reports that the caching has been successfully performed to the operation panel 27. When the success of the caching is reported, the success of the caching is displayed in the operation panel 27. In accordance with this, the user can understand that the caching of the user information has been successful. If the user information can be cached in the main body 10, by caching the same user information in the operation unit 20, even if the user information stored in the operation unit 20 is deleted when the composite device 100 is powered off, the composite device 100 can transfer the user information stored in the main body 10 to the operation unit 20 when the composite device 100 is powered on. The user information may be cached in the cached user information management DB 268 of the operation unit 20 and then the user information may be cached in the user information management DB 160 of the main body 10. In this case, it is possible to obtain information from one of the cached user information management DB 268 and the user information management DB 160 in which the caching has been successfully performed. Further, it is possible to report the information from this DB to the user. In accordance with this, if the caching of the user information in the main body 10 has failed and the caching of the user information in the operation unit 20 has been successful, when the composite device 100 is powered off and then powered on, the composite device 100 is capable of determining necessity to obtain the user information again. Further, if the caching of the user information in the main body 10 has been successful and the caching of the user information in the operation unit 20 has failed, when the composite device 100 is powered off and then powered on, the composite device 100 is capable of determining that the operation unit 20 can obtain the user information from the main body 10.

<Operation (3) of Information Processing System>

FIG. 10 shows an operation (3) of the information processing system.

In FIG. 10, when the composite device 100 is powered on, the operation unit 20 obtains user information cached in the main body 10 and caches the user information in the operation unit 20. The user information is stored in the cached user information management DB 162 of the main body 10 and in the cached user information management DB 268 of the operation unit 20 in the composite device 100. When the composite device 100 is powered off, information cached in the volatile storage unit 266 of the operation unit 20 is deleted. Accordingly, when the composite device 100 is powered on, the operation unit 20 obtains the user information stored in the cached user information management DB 162 of the nonvolatile storage unit 158 in the main body 10 and stores the user information in the cached user information management DB 268 of the volatile storage unit 266.

When the CPU 21 executes the authentication app 252, the CPU 21 causes the cache process providing unit 254 to function to cache the user information.

In step S1002, the composite device 100 is powered on.

In step S1004, the CPU 21 of the operation unit 20, the CPU 21 executing the authentication app 252, inputs, to the user information process unit 262, a cached user information obtaining request to obtain user information cached in the main body 10.

In step S1006, the user information process unit 262 transmits the cached user information obtaining request to the user information process unit 154 of the main body 10. The user information process unit 154 of the main body 10 obtains the user information cached in the cached user information management DB 162 of the nonvolatile storage unit 158.

In step S1008, the user information process unit 154 of the main body 10 transmits the user information to the user information process unit 262 of the operation unit 20.

In step S1010, the user information process unit 262 of the operation unit 20 caches the user information in the cached user information management DB 268 of the volatile storage unit 266 in the operation unit 20.

In accordance with this, even if the composite device 100 is powered off and the user information stored in the operation unit 20 is deleted, when the composite device 100 is powered on, the operation unit 20 can obtain, from the main body 10, the user information that is cached before the composite device 100 is powered off.

<Operation (4) of Information Processing System>

FIG. 11 shows an operation (4) of the information processing system.

In FIG. 11, authentication of a user is performed based on user information cached in the operation unit 20 of the composite device 100 and the user authentication is successful.

When the CPU 21 executes the authentication app 252, the CPU 21 causes the search process providing unit 256 to function to perform an authentication process.

In step S1102, when the user holds the IC card 300 over the card reader/writer 31, user identification information is read by the card reader/writer 31 and input to the CPU 21 executing the authentication app 252.

In step S1104, the CPU 21 executing the authentication app 252 causes the search process providing unit 256 to function and reports the user identification information to the search process providing unit 256.

In step S1106, the search process providing unit 256 inputs, to the authentication process unit 260, a cached user information search request to search the cached user information management DB 268 to determine whether user information cached in the cached user information management DB 268 has an item that corresponds to the user identification information.

In step S1108, the authentication process unit 260 inputs the cached user information search request to the user information process unit 262.

In step S1110, in accordance with the cached user information search request input by the authentication process unit 260, the user information process unit 262 searches the cached user information management DB 268 to determine whether user information cached in the cached user information management DB 268 has an item that corresponds to the user identification information.

In step S1112, the user information process unit 262 obtains a search result. In this case, since user information such as a user ID that corresponds to the user identification information is present in the cached user information management DB 268, the user information process unit 262 obtains a search result indicating that user information that corresponds to the user identification information is detected.

In step S1114, the user information process unit 262 reports the search result to the authentication process unit 260.

In step S1116, the authentication process unit 260 performs an authentication process based on the search result input from the user information process unit 262. In this case, since the user information that corresponds to the user identification information is detected, the authentication process unit 260 determines that authentication has been successful.

In step S1118, the authentication process unit 260 reports an authentication result to the search process providing unit 256.

In step S1120, the search process providing unit 256 reports the authentication result to the authentication app 252.

In step S1122, the authentication app 252 reports the authentication result to the operation panel 27. When the authentication result is reported, the success of the authentication is displayed in the operation panel 27. In accordance with this, the user can understand that the composite device 100 is available.

In this operation, an I/F that searches the cached user information management DB 268 to determine whether user information stored in the cached user information management DB 268 has an item that corresponds to the user identification information is provided. Whether to use the I/F can be specified with the authentication app 252. When the use of the I/F is specified with the authentication app 252, it is possible to perform authentication based on user information cached in the operation unit 20, so that a time from a request of an authentication process to an end of the authentication process is reduced. This is because there is no need to connect to the main body 10 and perform searching based on user information cached in the main body 10.

<Operation (5) of Information Processing System>

FIG. 12 shows an operation (5) of the information processing system.

In FIG. 12, authentication of a user is performed based on user information cached in the cached user information management DB 268 of the operation unit 20 in the composite device 100 but the authentication fails. Further, in FIG. 12, when the CPU 21 executes the authentication app 252, the CPU 21 causes the user information process providing unit 258 to function and user information about a user that has logged in is stored in the logged in user information management DB 270.

When the CPU 21 executes the authentication app 252, the CPU 21 causes the search process providing unit 256 to function to perform an authentication process. Steps S1202 to S1210 may use steps S1102 to S1110 shown in FIG. 11.

In step S1212, the user information process unit 262 obtains a search result. In this case, since there is no user information that corresponds to user identification information in the cached user information management DB 268, the user information process unit 262 determines that user information that corresponds to the user identification information is not detected.

In step S1214, the user information process unit 262 reports the search result to the authentication process unit 260.

In step S1216, in accordance with the search result input by the user information process unit 262, the failure to detect user information that corresponds to the user identification information is reported to the authentication process unit 260. The authentication process unit 260 inputs, to the user information process unit 262, a logged in user information search request to search the logged in user information management DB 270 to determine whether user information cached in the logged in user information management DB 270 has an item that corresponds to the user identification information.

In step S1218, in accordance with the logged in user information search request input by the authentication process unit 260, the user information process unit 262 searches the logged in user information management DB 270 to determine whether user information cached in the logged in user information management DB 270 has an item that corresponds to the user identification information.

In step S1220, the user information process unit 262 obtains a search result. In this case, since user information such as a user ID that corresponds to the user identification information is present in the logged in user information management DB 270, the user information process unit 262 determines that user information that corresponds to the user identification information is detected.

In step S1222, the user information process unit 262 reports the search result to the authentication process unit 260.

In step S1224, the authentication process unit 260 performs an authentication process based on the search result input from the user information process unit 262. In this case, since the user information that corresponds to the user identification information is detected, the authentication process unit 260 determines that authentication has been successful.

In step S1226, the authentication process unit 260 reports an authentication result to the search process providing unit 256.

In step S1228, the search process providing unit 256 reports the authentication result to the authentication app 252.

In step S1230, the authentication app 252 reports the authentication result to the operation panel 27. When the authentication result is reported, the success of the authentication is displayed in the operation panel 27.

In this operation, an I/F that stores user information about a user that has been successfully authenticated and logged in in the volatile storage unit 266 is provided. Whether to use the I/F can be specified with the authentication app 252. When the use of the I/F is specified with the authentication app 252, even if user information cached in the cached user information management DB 268 of the operation unit 20 does not have an item that corresponds to user identification information, it is possible to perform authentication based on user information cached in the logged in user information management DB 270. Accordingly, it is possible to reduce a time from a request of an authentication process to an end of the authentication process. This is because there is no need to connect to the main body 10 and perform searching based on user information cached in the main body 10.

<Operation (6) of Information Processing System>

FIG. 13 shows an operation (6) of the information processing system.

In FIG. 13, authentication of a user is performed based on user information cached in the cached user information management DB 268 and the logged in user information management DB 270 of the operation unit 20 in the composite device 100, but the two authentication processes fail, and a process request is sent to the authentication server 400. Steps S1302 to S1310 may use steps S1102 to S1110 shown in FIG. 11. Steps S1312 to S1318 may use steps S1212 to S1218 shown in FIG. 12.

In step S1320, the user information process unit 262 obtains a search result. In this case, since user information that corresponds to user identification information is not present in the logged in user information management DB 270, the user information process unit 262 obtains a search result indicating that user information that corresponds to the user identification information is not detected.

In step S1322, the user information process unit 262 reports the search result to the authentication process unit 260.

In step S1324, in accordance with the search result input by the user information process unit 262, the failure to detect user information that corresponds to the user identification information is reported to the authentication process unit 260. The authentication process unit 260 transmits, from the communication I/F 25 to the authentication server 400, a user information search request to search the authentication server 400 to determine whether there is an item that corresponds to the user identification information. In this case, the authentication process unit 260 can also request authentication by transmitting the user identification information from the communication I/F 25 to the authentication server 400.

In step S1326, in accordance with the user information search request input by the authentication process unit 260, the authentication server 400 searches user information registered in advance and reports a search result thereof to the authentication process unit 260. If there is user information that corresponds to the user identification information, the authentication server 400 may also report the user information that corresponds to the user identification information in addition to the search result. The following describes a case where user information registered in advance in the authentication server 400 has an item that corresponds to the user identification information.

In step S1328, the authentication process unit 260 performs an authentication process based on the search result transmitted by the authentication server 400. In this case, since user information that corresponds to the user identification information is detected in the authentication server 400, the authentication process unit 260 determines that the authentication has been successful.

In step S1330, the authentication process unit 260 reports an authentication result to the search process providing unit 256. The authentication process unit 260 also reports the user information transmitted from the authentication server 400 in addition to the authentication result.

In step S1332, the search process providing unit 256 reports the authentication result to the authentication app 252. The search process providing unit 256 also reports the user information in addition to the authentication result.

In step S1334, the authentication app 252 reports the authentication result to the operation panel 27. When the authentication result is reported, the success of the authentication is displayed in the operation panel 27. In accordance with this, the user can understand that the composite device 100 is available.

In step S1336, the authentication app 252 sends a caching request provided with the user information to the cache process providing unit 254.

Steps S1338 to S1350 may use steps S906 to S918 shown in FIG. 9.

In this operation, an I/F that searches the cached user information management DB 268 and the logged in user information management DB 270 to determine whether user information stored in the cached user information management DB 268 or the logged in user information management DB 270 has an item that corresponds to the user identification information is provided. Whether to use the I/F can be specified with the authentication app 252. When the use of the I/F is specified with the authentication app 252, even if user information cached in the operation unit 20 does not have an item that corresponds to user identification information, the operation unit 20 may send, to the authentication server 400, an inquiry of whether user information that corresponds to the user identification information is registered. In accordance with this, the composite device 100 can cause the authentication server 400 to perform searching in order to securely perform an authentication process. Further, if a request for searching for the user identification information is sent to the authentication server 400 and user information that corresponds to the user identification information is registered with the authentication server 400, the operation unit 20 can obtain the user information. Since the operation unit 20 can cache the user information, the operation unit 20 can use the cached user information when the same user uses the composite device 100. Accordingly, it is possible to speed up the authentication process.

<Operation (7) of Information Processing System>

FIG. 14 shows an operation (7) of the information processing system.

In FIG. 14, authentication of a user is performed based on user information cached in the cached user information management DB 268 and the logged in user information management DB 270 of the operation unit 20 in the composite device 100, but the two authentication processes fail, and a process request is sent to the authentication server 400. A difference from FIG. 13 is that user information that corresponds to user identification information is stored in the logged in user information management DB 270 of the operation unit 20 in FIG. 14.

Steps S1402 to S1410 may use steps S1102 to S1110 shown in FIG. 11. Steps S1412 to S1418 may use steps S1212 to S1218 shown in FIG. 12. Steps S1420 to S1438 may use steps S1320 to S1338 shown in FIG. 13.

In step S1440, the user information process unit 262 of the operation unit 20 caches user information in the logged in user information management DB 270 of the volatile storage unit 266.

In step S1442, the logged in user information management DB 270 reports that the caching has been successfully performed to the user information process unit 262.

In step S1444, the user information process unit 262 of the operation unit 20 reports that the caching has been successfully performed to the cache process providing unit 254.

In step S1446, the cache process providing unit 254 of the operation unit 20 reports that the caching has been successfully performed to the CPU 21 of the operation unit 20, the CPU 21 executing the authentication app 252.

In step S1448, the CPU 21 of the operation unit 20, the CPU 21 executing the authentication app 252, reports that the caching has been successfully performed to the operation panel 27. When the success of the caching is reported, the success of the caching is displayed in the operation panel 27. In accordance with this, the user can understand that the caching of the user information has been successful.

Whether user information that corresponds to user identification information is to be stored in the user information management DB 160 of the main body 10 as shown in FIG. 13 or in the logged in user information management DB 270 of the operation unit 20 as shown in FIG. 14 is determined by the authentication app 252 in advance. In accordance with this, the same effects as in FIG. 13 are provided.

<Operation (8) of Information Processing System>

FIG. 15 shows an operation (8) of the information processing system.

In FIG. 15, the authentication app 252 sets cached user information not to be used. In other words, the cache process providing unit 254, the search process providing unit 256, and the user information process providing unit 258 are set to be disabled even if the CPU 21 executes the authentication app 252.

In step S1502, when the user holds the IC card 300 over the card reader/writer 31, user identification information is read by the card reader/writer 31 and input to the CPU 21 executing the authentication app 252.

In step S1504, the CPU 21 executing the authentication app 252 transmits, from the communication OF 25 to the authentication server 400, a user information search request to search the authentication server 400 to determine whether user information registered in the authentication server 400 has an item that corresponds to the user identification information. In this case, the CPU 21 can also request authentication by transmitting the user identification information from the communication I/F 25 to the authentication server 400.

In step S1506, in accordance with the user information search request transmitted by the operation unit 20, the authentication server 400 searches the user information registered in advance and reports a search result thereof to the operation unit 20. The authentication server 400 also reports user information that corresponds to the user identification information in addition to the search result. In this case, an item that corresponds to the user identification information is present in the user information registered with the authentication server 400 in advance.

In step S1508, the authentication app 252 performs an authentication process based on the search result transmitted by the authentication server 400. In this case, since the user information that corresponds to the user identification information is detected in the authentication server 400, the authentication app 252 determines that the authentication has been successful.

In step S1510, the authentication app 252 reports an authentication result to the operation panel 27. When the authentication result is reported, the success of the authentication is displayed in the operation panel 27. In accordance with this, the user can understand that the composite device 100 is available.

In the present embodiment, when the IC card 300 is held over the composite device 100, the user identification information is read and the authentication is performed based on the user identification information. However, the authentication is not limited to this example. It is possible to display a log-in screen in the operation panel 27 and allow the user to input a user ID and a password, such that authentication is performed based on the user ID and the password.

In the present embodiment, the authentication app 252 is mainly described as a program to be executed by the operation unit 20. However, the program is not limited to the authentication app 252. It is possible to apply the present invention to a case where an app other than the authentication app 252 is executed.

According to the present embodiment, the I/F that caches user information about a user that has been successfully authenticated, the I/F that performs a search to determine whether user identification information corresponds to any one of sets of cached user information, and the I/F that caches user information about a logged in user are provided in the operation unit 20 of the composite device 100. Accordingly, vendors of programs such as the authentication app 252 can select from these I/Fs to use. In other words, by providing a right to access the storage unit of the composite device 100, it is possible to allow the authentication app 252 to determine whether to use the right to access.

Second Embodiment

<Information Processing System>
The information processing system according to the present embodiment may be shown in FIGS. 1 to 4.

The information processing system according to the present embodiment is capable of changing user information. When the user requests a change of the user information, the CPU 21 executing the authentication app 252 receives the user information change request. The CPU 21 executing the authentication app 252 reports the user information change request to the main body 10. In response to the user information change request, the main body 10 changes relevant user information, which is requested to be changed by the user information change request, from user information stored in the user information management DB 160.

After the main body 10 has changed the user information stored in the user information management DB 160, the main body 10 transmits a user information update report with the changed user information to the operation unit 20. In accordance with the user information update report transmitted by the main body 10, the operation unit 20 updates user information cached in the cached user information management DB 268.

<Operation (9) of Information Processing System>
FIG. 16 shows an operation (9) of the information processing system.

In step S1602, the user sends a request for a change of user information to the composite device 100. For example, the user may connect an information terminal device such as a PC that stores user information to the composite device 100 and request a process to change user information.

In step S1604, the CPU 21 executing the authentication app 252 receives the user information change request. The CPU 21 executing the authentication app 252 reports the user information change request to the main body 10.

In step S1606, in accordance with the user information change request, the user information process unit 154 of the main body 10 changes relevant user information from user information stored in the user information management DB 160, the relevant user information being requested to be changed by the user information change request.

In step S1608, the user information process unit 154 of the main body 10 transmits a user information update report provided with the changed user information to the operation unit 20.

In step S1610, in accordance with the user information update report transmitted by the main body 10, the user information process unit 262 of the operation unit 20 updates user information cached in the cached user information management DB 268.

According to the present embodiment, if the user information stored in the main body 10 is to be changed, it is possible to apply the change of the user information to the cached user information management DB 268 of the operation unit 20. In other words, it is possible to synchronize user information stored in the operation unit 20 with corresponding information stored in the user information management DB 160 of the main body 10.

In addition, the above-mentioned embodiment does not limit the scope of the present invention. It is possible to store, in a given server, the same information as stored in the nonvolatile storage unit 158 of the main body 10. Further, one of or both the main body 10 and the operation unit 20 that constitute the composite device 100 may have a plurality of bodies.

In addition, the configuration of the composite device 100 where the main body 10 and the operation unit 20 are connected in the present embodiment is an example and there may be various configuration examples depending on uses and purposes.

The composite device 100 is an example of an information processing system. The main body 10 is an example of a first information processing device. The operation unit 20 is an example of a second information processing device. The user information management DB 160 is an example of a first storage. The cached user information management DB 268 is an example of a second storage. The logged in user information management DB 270 is an example of a third storage. The cache process providing unit 254 is an example of a first determining unit. The search process providing unit 256 is an example of a second determining unit. The user information process providing unit 258 is an example of a third determining unit. The authentication app 252 is an example of a program. The card reader/writer 31 is an example of a user identification information obtaining unit. The authentication process unit 260 is an example of a predetermined process unit. And the program for the operation unit 20 is an example of an information processing program.

Third Embodiment

The information processing system according to the present invention may have various system configurations depending on uses and purposes. In the present embodiment, some of such various system configurations of the image processing system are described.

<Functional Configuration>

FIG. 17 is a diagram showing a functional configuration of the information processing system according to a third embodiment. An information processing system 1 includes the composite device 100 and an external server 1701 connected to the composite device 100 via the network 30. In addition, the information processing system 1 may not include the external server 1701.

The external server 1701 is a server device having a first user information management DB 160a that stores user information about a user of the composite device 100 (or the information processing system 1). An example of the external server 1701 is the authentication server 400 shown in FIG. 1. Another example of the external server 1701 may be an information providing server, a database server, or a storage server. For example, the authentication app 252 may obtain user information from the external server 1701 and use the obtained user information and user identification information to perform an authentication process in the authentication app 252.

It is assumed that in the information processing system 1 according to the present embodiment, the user information management DB 160 shown in FIG. 4 is included in one of or both the external server 1701 and the main body 10 of the composite device 100. Further, in the present embodiment, the user information management DB 160 included in the external server 1701 is referred to as the first user information management DB 160a and the user information management DB 160 included in the main body 10 is referred to as a second user information management DB 160b. In addition, the external server 1701 and the main body 10 are an example of an external device that stores user information about one or more users of the composite device 100.

If the information processing system 1 includes the first user information management DB 160a and the second user information management DB 160b, the second user information management DB 160b preferably stores a part of user information stored in the first user information management DB 160a. For example, the first user information management DB 160a stores all user information about companies, for example and the second user information management DB 160b stores user information about places and countries where the composite devices 100 are installed. In accordance with this, the composite devices 100 can save storage capacity of the nonvolatile storage unit 158 and speed up a process to search user information.

(Functional Configuration of Composite Device)

The operation unit 20 of the composite device 100 according to the present embodiment includes a storage unit 1702 instead of the volatile storage unit 266 shown in FIG. 4.

The storage unit 1702 is implemented by the RAM 23, the flash memory 24, and a program operating on the CPU 21 shown in FIG. 2. In other words, the storage unit 1702 according to the present embodiment may be a volatile storage unit or a nonvolatile storage unit.

Further, the operation unit 20 according to the present embodiment uses the communication I/F 25 shown in FIG. 2, for example, to be communicatively connected to the external server 1701. In addition, other portions of the configuration are the same as the functional configuration of the composite device 100 shown in FIG. 4.

<Flow of Process>

In the following, an information processing method performed by the information processing system 1 according to the present embodiment is described.

FIG. 18 is a sequence diagram (1) of a user authentication process according to the third embodiment. Since the process shown in FIG. 18 substantially corresponds to the user authentication process in the first embodiment shown in FIG. 13 and a basic process is the same, a difference will be mainly described.

In the first embodiment, the user authentication process is performed by the authentication process unit 260 in step S1328 shown in FIG. 13, for example. However, this process is an example and the user authentication process may be performed by the authentication app 252.

In step S1801, the authentication app 252 of the operation unit 20 obtains user identification information read by the card reader/writer 31.

In step S1802, the authentication app 252 uses an interface (API) provided by the search process providing unit 256 to request a search for the obtained user identification information to the search process providing unit 256.

In step S1803, the search process providing unit 256 sends, to the authentication process unit 260, a request to search the storage unit 1702 in order to determine whether user information stored in the storage unit 1702 has an item that corresponds to the user identification information.

In step S1804, the authentication process unit 260 uses the user information process unit 262 to search the cached user information management DB 268 to determine whether user information cached in the cached user information management DB 268 has an item that corresponds to the user identification information. Although the user information process unit 262 is omitted from FIG. 18, the process in step S1804 is the same as the process in steps S1308 and S1310 shown in FIG. 13, for example.

In step S1805, the authentication process unit 260 obtains a search result via the user information process unit 262. In this case, it is assumed that user information that corresponds to the user identification information is not present in the cached user information management DB 268 and so the search result is a "failure." In addition, the process in step S1805 is the same as the process in steps S1312 and S1314 shown in FIG. 13, for example.

In step S1806, the authentication process unit 260 uses the user information process unit 262 to search the logged in user information management DB 270 to determine whether user information cached in the logged in user information management DB 270 has an item that corresponds to the user identification information. In addition, this process is the same as the process in steps S1316 and S1318 shown in FIG. 13, for example.

In step S1807, the authentication process unit 260 obtains a search result via the user information process unit 262. In this case, it is assumed that user information such as a user ID that corresponds to the user identification information is not present in the logged in user information management DB 270 and so the search result is a "failure." In addition, the process in step S1807 is the same as the process in steps S1320 and S1322 shown in FIG. 13.

In step S1808, the authentication process unit 260 reports, to the search process providing unit 256, the search result "failure" indicating that user information stored in the storage unit 1702 does not have an item that corresponds to the user identification information.

In step S1809, the search process providing unit 256 reports, to the authentication app 252, the search result "failure" indicating that user information stored in the storage unit 1702 does not have an item that corresponds to the user identification information.

In step S1810, if the search result "failure" is reported from the search process providing unit 256, namely, if authentication using user information stored in the storage unit 1702 has failed, the authentication app 252 sends, to the external server 1701, a request to search user information in the external server 1701.

In step S1811, the external server 1701 reports, to the authentication app 252, a search result indicating whether user information that corresponds to the user identification information is present in the first user information management DB 160*a* included in the external server 1701. In FIG. 18, it is assumed that the search result indicates "success" and includes the user information that corresponds to the user identification information.

In step S1812, the authentication app 252 performs an authentication process based on the user information included in the search result reported from the external server 1701. For example, since the user information that corresponds to the user identification information is detected in the external server 1701, the authentication app 252 determines that the authentication has been successful. In response to this, the authentication app 252 displays that the authentication has been successful in the operation panel 27, for example.

In step S1813, in accordance with a request from the authentication app 252, caching of the user information in steps S904 to S916 shown in FIG. 9, for example, is performed. In accordance with this, the user information that has been successfully authenticated is stored in the cached user information management DB 268 or the cached user information management DB 162, for example.

In addition, in step S1805 or S1807, if user information that corresponds to the user identification information is retrieved, the authentication process unit 260 reports a search result indicating "success" and including the retrieved user information to the authentication app 252 via the search process providing unit 256. In this case, the authentication app 252 may use the user information reported from the authentication process unit 260 to perform an authentication process.

In this manner, the authentication app 252 according to the present embodiment uses user information stored in the storage unit 1702 to perform authentication of a user that is to start using the composite device 100. Further, if authentication using the user information stored in the storage unit 1702 has failed, the authentication app 252 can use user information stored in the external server 1701 to perform authentication of the user that is to start using the composite device 100.

FIG. 19 is a sequence diagram (2) of a user authentication process according to the third embodiment. Since the process in steps S1801 to S1809, S1812, and S1813 in FIG. 19 is the same as in FIG. 18, a difference is mainly described in the following.

In step S1901, if a search result "failure" is reported from the search process providing unit 256, namely, if authentication using user information stored in the storage unit 1702 has failed, the authentication app 252 sends, to the main body 10, a request to search user information in the main body 10.

In step S1902, the user information process unit 154 of the main body 10 reports, to the authentication app 252, a search result indicating whether user information that corresponds to the user identification information is present in the second user information management DB 160*b* included in the main body 10. In FIG. 19, it is assumed that the search result indicates "success" and includes the user information that corresponds to the user identification information. In addition, the process from step S1812 is the same as in FIG. 18.

In this manner, if authentication using the user information stored in the storage unit 1702 has failed, the authentication app 252 according to the present embodiment can use user information stored in an external device (such as the external server 1701 or the main body 10) to perform authentication of a user.

FIG. 20 is a sequence diagram (3) of a user authentication process according to the third embodiment. Since the process in steps S1801 to S1809, S1812, and S1813 in FIG. 20 is the same as in FIG. 18, a difference is mainly described in the following.

In step S2001, if a search result "failure" is reported from the search process providing unit 256, namely, if authentication using user information stored in the storage unit 1702 has failed, the authentication app 252 sends, to the main body 10, a request to search user information in the main body 10.

In step S2002, the user information process unit 154 of the main body 10 reports, to the authentication app 252, a search result indicating whether user information that corresponds to the user identification information is present in the second user information management DB 160*b* included in the main body 10. In FIG. 20, it is assumed that the search result indicates "failure."

In step S2003, if the search result "failure" is reported from the search process providing unit 256, namely, if authentication using user information stored in the main body 10 has failed, the authentication app 252 sends, to the external server 1701, a request to search user information in the external server 1701.

In step S2004, the external server 1701 reports, to the authentication app 252, a search result indicating whether user information that corresponds to the user identification information is present in the first user information management DB 160*a* included in the external server 1701. In FIG. 20, it is assumed that the search result indicates "success" and includes the user information that corresponds to the user identification information. In addition, the process from step S1812 is the same as in FIG. 18.

In this manner, if authentication using the user information stored in the storage unit 1702 has failed, the authentication app 252 according to the present embodiment can use user information stored in a plurality of external devices (such as the external server 1701 and the main body 10) to perform authentication of a user.

Other Embodiments

The configuration of the information processing system 1 shown in FIG. 17 is an example. The application layer 201 of the operation unit 20 may include a plurality of authentication apps 252 such as face authentication, voice authentication, and fingerprint authentication.

In this case, each of the authentication apps 252 can use user information stored in the storage unit 1702 though an interface (API) provided by the search process providing unit 256 and perform an authentication process.

Further, each authentication app 252 can cache (store) the user information in the storage unit 1702 through an interface (API) provided by the cache process providing unit 254, the user information having been used for the authentication process. In accordance with this, each authentication app 252 can feely select whether to cache information used for the authentication process in the storage unit 1702.

While the present invention is described with reference to specific examples and variations, each example or variation is used only for illustrative purposes. Those skilled in the art will understand various types of variations, modifications, alternatives, and replacements. While the devices according to examples of the present invention are described using functional block diagrams for convenience sake, such devices may be implemented by hardware, software, or a combination thereof. The present invention is not limited to the above-mentioned examples and various types of variations, modifications, alternatives, and replacements are included without departing from the scope of the present invention.

The present invention is not limited to the specifically disclosed embodiments, but various variations and modifications may be made without departing from the scope of the present invention.

The present application is based on and claims the benefit of priorities of Japanese Priority Patent Application No. 2014-261712 filed on Dec. 25, 2014 and Japanese Priority Patent Application No. 2015-242835 filed on Dec. 14, 2015 the entire contents of which are hereby incorporated by reference.

REFERENCE SIGNS LIST

1 information processing system
10 main body (first information processing device, execution unit)
11, 21 CPU
12, 22 ROM
13, 23 RAM
14 HDD
15, 25 communication I/F
16, 26 connection I/F
17 engine unit
18, 29 system bus
20 operation unit (second information processing device)
24 flash memory
27 operation panel
28 external connection I/F
30 network
31 card reader/writer (user identification information obtaining unit)
32 communication path
100 composite device (image processing apparatus)
252 authentication app (program)
254 cache process providing unit (first determining unit)
256 search process providing unit (second determining unit)
258 user information process providing unit (third determining unit)
260 authentication process unit (predetermined process unit)
262 user information process unit
300 IC card
400 authentication server (server device)
1701 external server
1702 storage unit

The invention claimed is:

1. An information processing system comprising:
a first storage that stores user information about one or more users of the information processing system;
a second storage; and
a processor that is configured to
provide an Application Programming Interface (API) for allowing an application program to request caching of the user information in the second storage, and determine whether to store, in the second storage, user information used in the application program, depending on whether the application program requests the caching of the used user information by use of the Application Programming Interface (API);
obtain the used user information from the first storage and store the used user information in the second storage if the processor determines that the used user information is to be stored in the second storage;
determine whether to perform a specified process using the used user information in the second storage, depending on whether the application program requests the performing of the specified process; and
perform the specified process using the used user information in the second storage if the processor determines that the specified process is to be performed,
wherein if the processor cannot perform the specified process using the used user information stored in the second storage, the processor performs the specified process using the user information about one or more users stored in the first storage.

2. The information processing system as claimed in claim 1,
wherein the processor is further configured to obtain user identification information to identify one of the one or more users that is to use the information processing system, wherein the processor searches the used user information stored in the second storage and permits the one of the one or more users to use the information processing system if the used user information includes the user identification information.

3. An image processing apparatus comprising:
a first information processing device; and
a second information processing device in communication with the first information processing device, wherein
the second information processing device includes
a storage, and
a processor that is configured to
provide an Application Programming Interface (API) for allowing an application program to request caching of, in the storage, user information about one or more users of the image processing apparatus, the user information being stored in one or more external devices, and determine whether to store, in the storage, user information used in the application program, depending on whether the application program requests the caching of the used user information by use of the Application Programming Interface (API), and
obtain the used user information from the one or more external devices and store the used user information in the storage if the processor determines that the used user information is to be stored in the storage, wherein the storage of the second information processing device includes a volatile storage, wherein the first information processing device includes a nonvolatile storage that stores the used user information to be stored in the volatile storage, and wherein when the image processing apparatus is powered on, the processor obtains the used user information stored in the nonvolatile storage from the first image processing device and stores the used user information in the storage.

4. The image processing apparatus as claimed in claim 3, wherein one of the one or more external devices includes a server device connected to the image processing apparatus via a network.

5. The image processing apparatus as claimed in claim 3, wherein the application program authenticates one of the one or more users of the image processing apparatus, and the processor provides an interface for the application program to store the used user information in the storage.

6. The image processing apparatus as claimed in claim 3, wherein the application program uses the used user information, the used user information being stored in the storage, to authenticate one of the one or more users that is to use the image information apparatus.

7. The image processing apparatus as claimed in claim 6, wherein if the application program fails to authenticate the one of the one or more users using the used user information stored in the storage, the application program uses the user information about the one or more users, the user information being stored in the one or more external devices, to authenticate the one of the one or more users that is to use the image information apparatus.

8. An information processing method performed by an information processing system including a first storage that stores user information about one or more users of the information processing system: a second storage; and a processor, the information processing method comprising:

by the processor, providing an Application Programming Interface (API) for allowing an application program to request caching of the user information in the second storage, and determining whether to store, in the second storage, user information used in the application program, depending on whether the application program requests the caching of the used user information by use of the Application Programming Interface (API);

by processor, obtaining the used user information from the first storage and storing the used user information in the second storage if the processor determines that the used user information is to be stored in the second storage;

by the processor, determining whether to perform a specified process using the used user information in the second storage, depending on whether the application program requests the performing of the specified process; and by the processor, performing the specified process using the used user information in the second storage if the processor determines that the specified process is to be performed, wherein if the specified process using the used user information stored in the second storage cannot be performed, the specified process is performed by the processor using the user information about one or more users stored in the first storage.

\* \* \* \* \*